(12) United States Patent
Lee et al.

(10) Patent No.: US 10,739,867 B2
(45) Date of Patent: Aug. 11, 2020

(54) CHARACTER INPUT APPARATUS

(71) Applicants: Gyu Hong Lee, Seoul (KR); DAESAN BIOTECH, Gimpo-si (KR); Gang Seon Yu, Gimpo-si (KR)

(72) Inventors: Gyu Hong Lee, Seoul (KR); Gang Seon Yu, Gimpo-si (KR)

(73) Assignees: Gyu Hong Lee, Seoul (KR); DAESAN BIOTECH, Gyeonggi-Do (KR); Gang Seon Yu, Gyeonggi-Do (KR)

( * ) Notice: Subject to any disclaimer, the term of this patent is extended or adjusted under 35 U.S.C. 154(b) by 0 days.

(21) Appl. No.: 16/332,335

(22) PCT Filed: Aug. 25, 2017

(86) PCT No.: PCT/KR2017/009325
§ 371 (c)(1),
(2) Date: Mar. 11, 2019

(87) PCT Pub. No.: WO2018/056597
PCT Pub. Date: Mar. 29, 2018

(65) Prior Publication Data
US 2019/0204934 A1    Jul. 4, 2019

(30) Foreign Application Priority Data
Sep. 23, 2016  (KR) .......................... 10-2016-0121857

(51) Int. Cl.
*G06F 3/01*    (2006.01)
*G06F 3/0489*  (2013.01)
(Continued)

(52) U.S. Cl.
CPC ................ *G06F 3/018* (2013.01); *G06F 3/01* (2013.01); *G06F 3/023* (2013.01); *G06F 3/0233* (2013.01);
(Continued)

(58) Field of Classification Search
CPC .......... G06F 3/018; G06F 40/40; G06F 40/58; G06F 3/01; G06F 3/023; G06F 3/0489; G06F 3/0233; G06F 3/04847; G10L 13/08
See application file for complete search history.

(56) References Cited

U.S. PATENT DOCUMENTS 6,182,099 B1   1/2001 Nakasato
7,403,888 B1   7/2008 Wang et al.
(Continued)

FOREIGN PATENT DOCUMENTS

EP   2381348 A1   10/2011
JP   08-050524 A   2/1996
(Continued)

OTHER PUBLICATIONS

Office Action for Australian Patent Application No. 2017330795 dated Jan. 31, 2020; 5 pgs.
(Continued)

*Primary Examiner* — Premal R Patel
(74) *Attorney, Agent, or Firm* — Umberg Zipser LLP

(57) ABSTRACT

The present invention relates to a character input apparatus comprising: a character input unit for inputting of a character and a character display unit for displaying the inputted character on a display. The character input apparatus consists of one or more character input units assembled by a unit of a character input, is divided into a language input unit for inputting an input of a language character and a miscellaneous input unit in terms of a function and divided into a right character input part, a left character input part, an upper character input part, a lower character input part, and a central character input part in terms of a layout allowing a simultaneous inputting of characters of two or more languages, and two or more language input units and one or more miscellaneous input units are at all times arranged in
(Continued)

the character input unit and characters of a plurality of languages are at all times displayed in the character input unit to simultaneously input the characters of two or more languages without an operation of language conversion.

13 Claims, 30 Drawing Sheets

(51) Int. Cl.
    *G06F 3/023*         (2006.01)
    *G06F 3/0484*       (2013.01)
    *G10L 13/08*        (2013.01)
    *G06F 40/40*        (2020.01)
    *G06F 40/58*        (2020.01)

(52) U.S. Cl.
    CPC ........ *G06F 3/0489* (2013.01); *G06F 3/04847* (2013.01); *G06F 40/40* (2020.01); *G06F 40/58* (2020.01); *G10L 13/08* (2013.01)

(56) References Cited

U.S. PATENT DOCUMENTS

| | | |
|---|---|---|
| 2006/0256139 A1 | 11/2006 | Gikandi |
| 2008/0259039 A1* | 10/2008 | Kocienda ............. G06F 3/0238 345/173 |
| 2009/0189865 A1* | 7/2009 | Mishra .................... G06F 3/018 345/173 |
| 2012/0029902 A1 | 2/2012 | Lu et al. |
| 2012/0313858 A1* | 12/2012 | Park ....................... G06F 3/0238 345/171 |
| 2013/0124187 A1 | 5/2013 | Qin |
| 2015/0100913 A1 | 4/2015 | Park |
| 2015/0324162 A1* | 11/2015 | Kim ....................... G06F 1/1649 345/169 |

FOREIGN PATENT DOCUMENTS

| | | |
|---|---|---|
| JP | H0850524 A | 2/1996 |
| JP | 2001-222362 A | 8/2001 |
| KR | 10-0577394 B1 | 5/2006 |
| KR | 20120073548 A | 7/2012 |
| KR | 1020120073548 A | 7/2012 |
| KR | 20120136796 A | 12/2012 |
| KR | 1020120136796 A | 12/2012 |
| SU | 1839245 A2 | 7/1990 |

OTHER PUBLICATIONS

Office Action for Russian Patent Application No. 2019110054/08(019275) dated Dec. 11, 2019; 8 pgs.

\* cited by examiner

【FIG. 1】
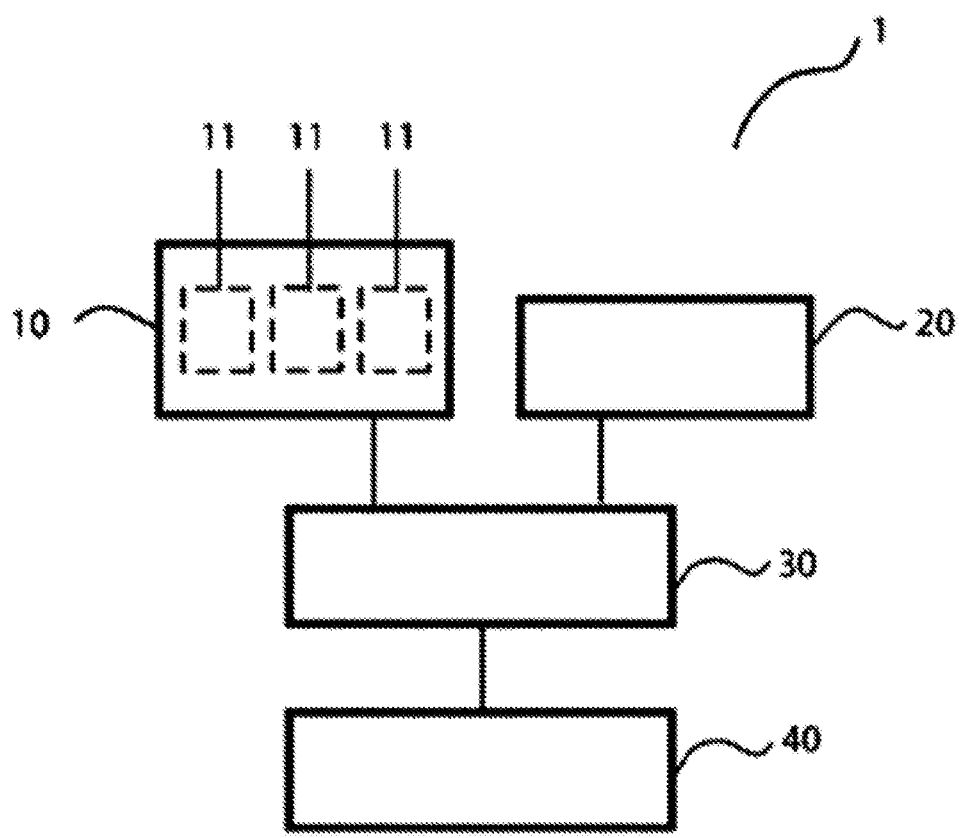

[FIG. 2A]
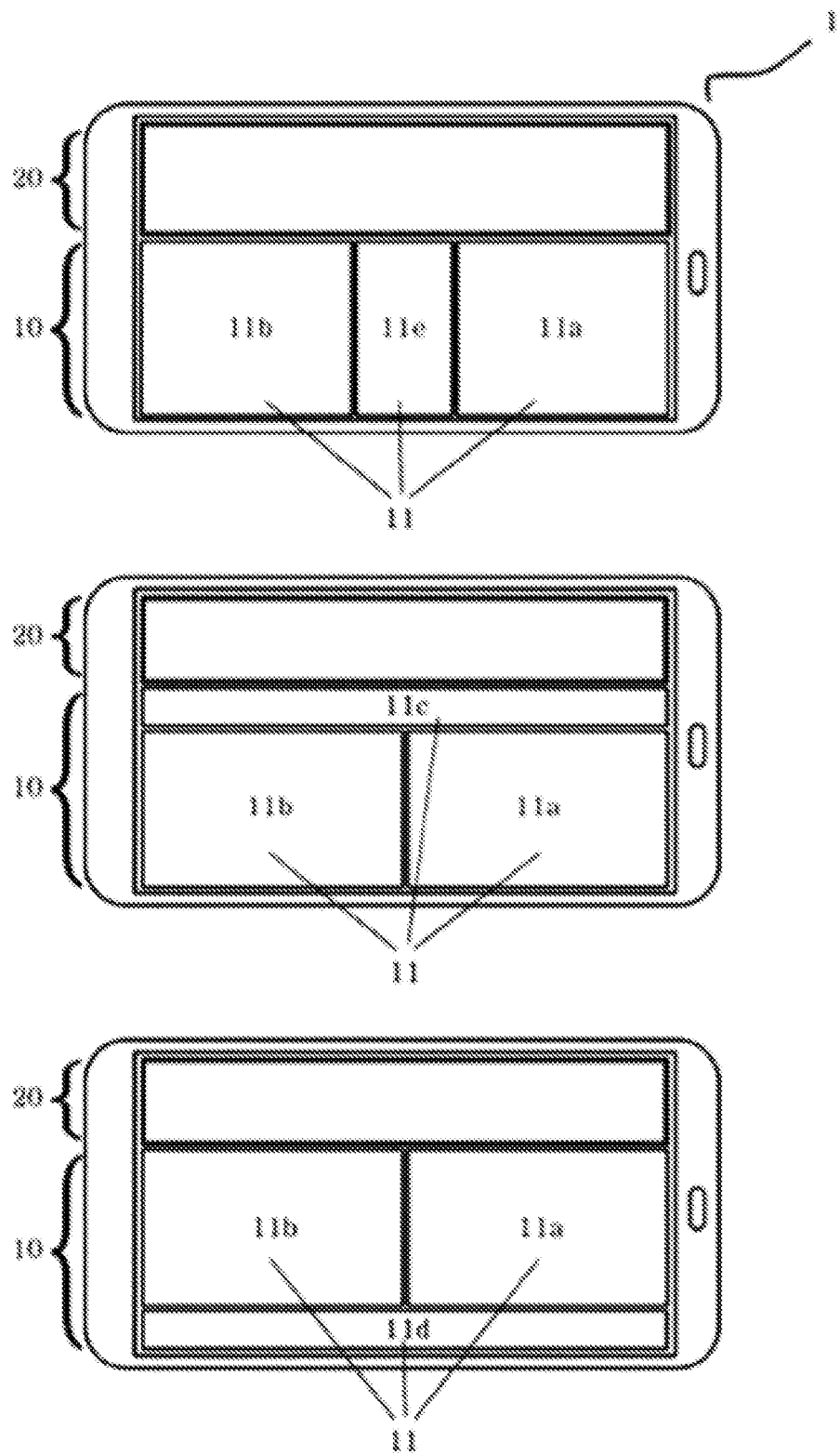

【FIG. 2B】
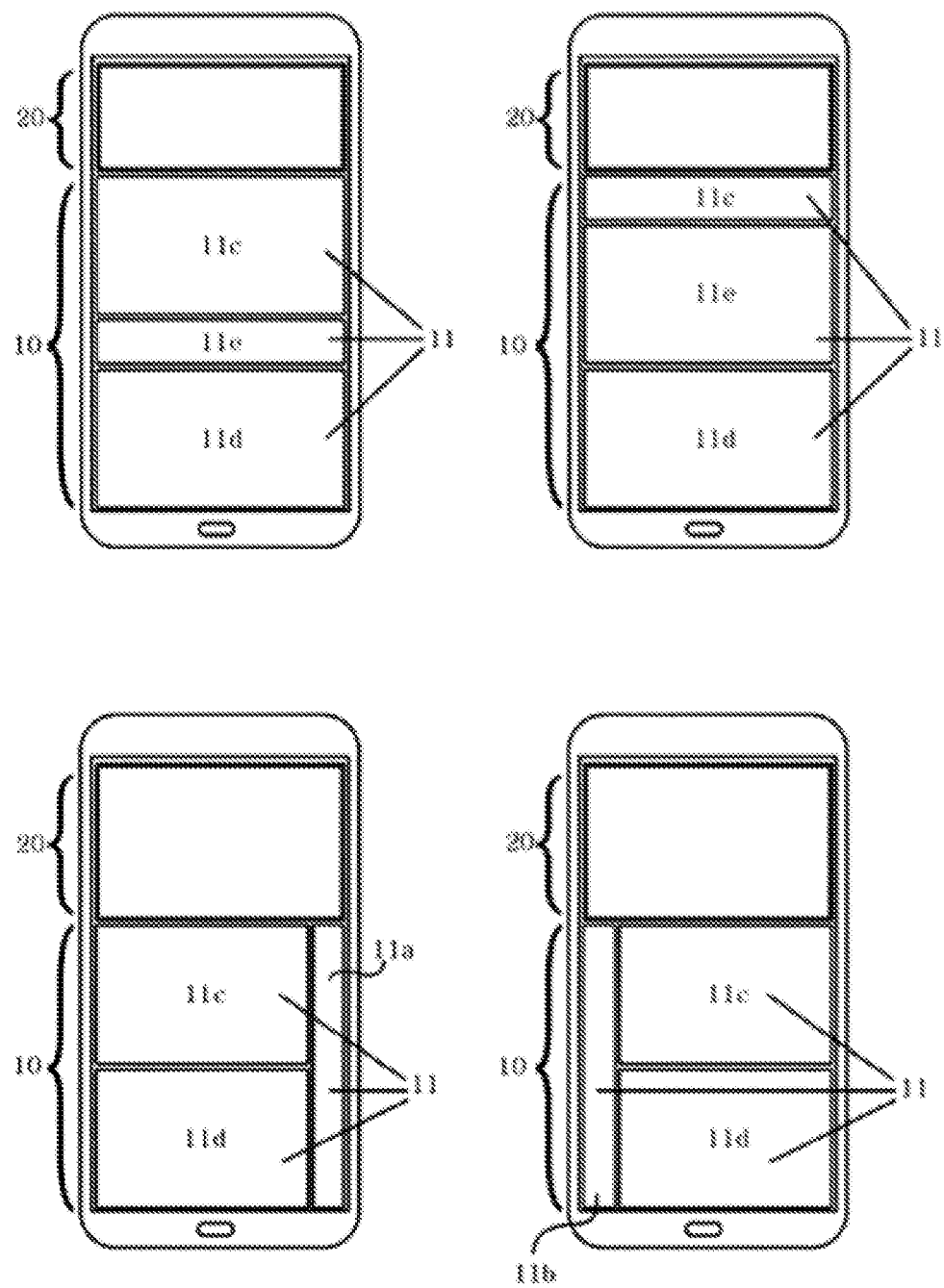

【FIG. 3A】
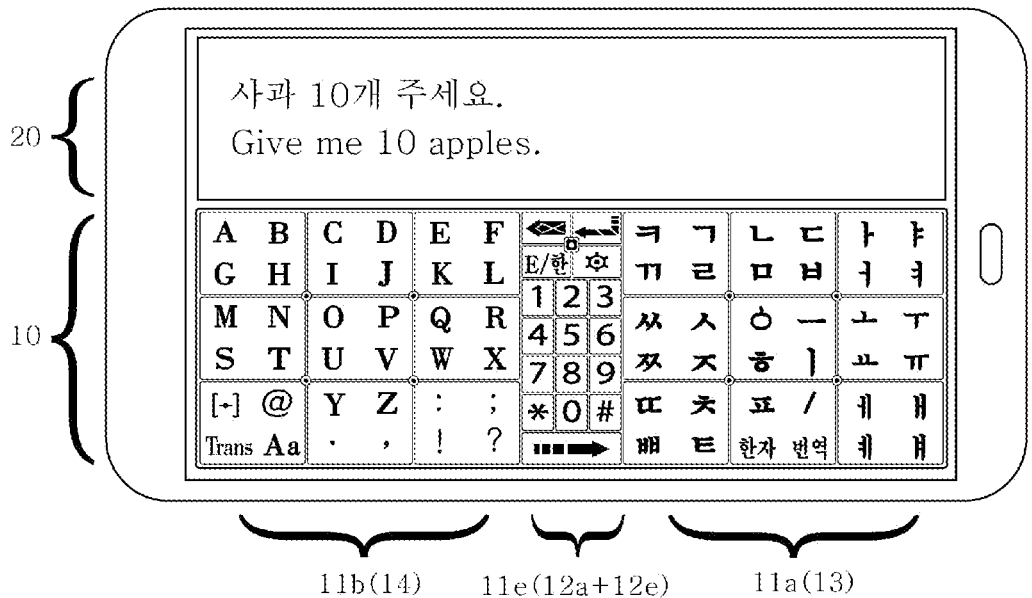
【FIG.3B】
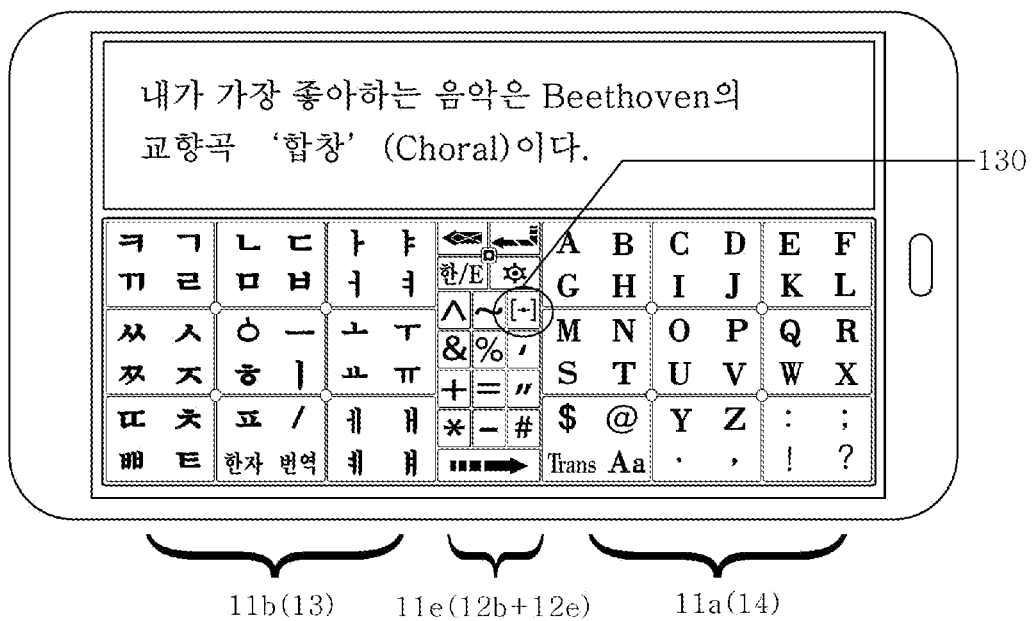

[FIG. 3C]
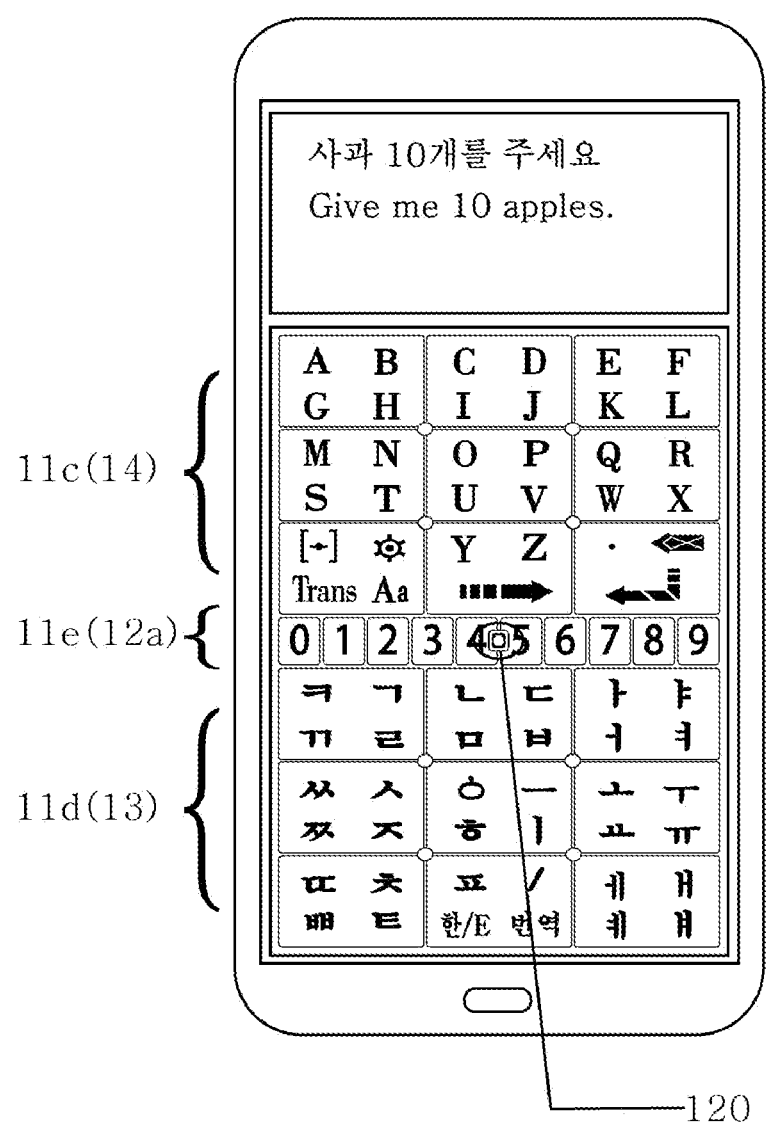

【FIG. 3D】
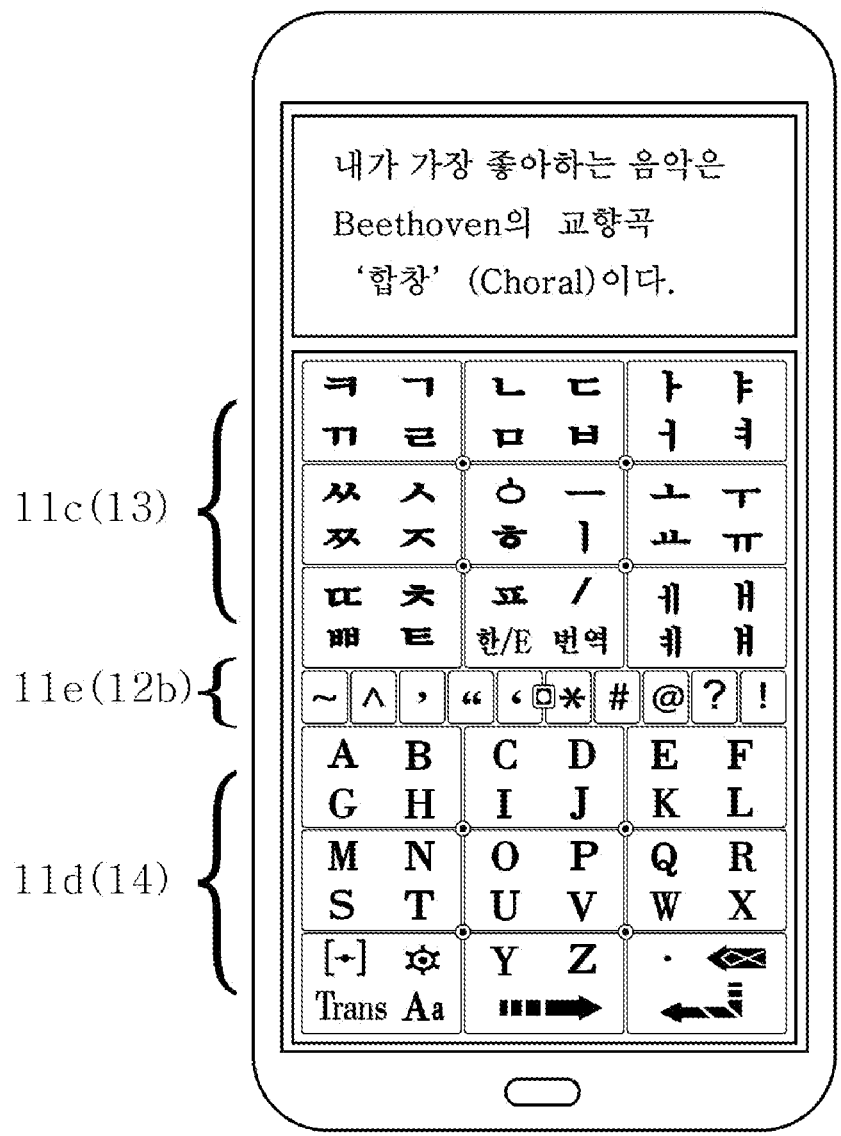

[FIG. 4A]
[FIG. 4B]
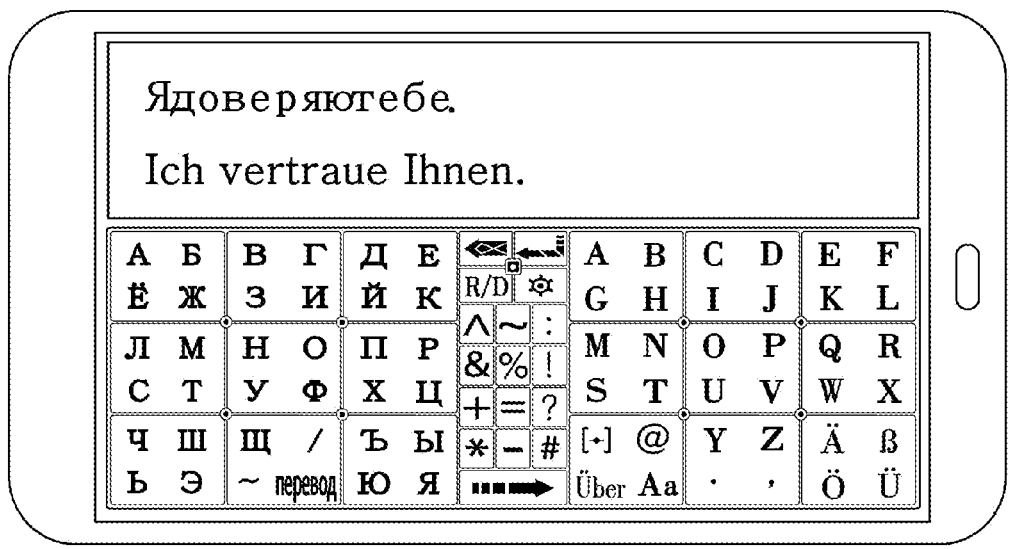

[FIG. 4C]
[FIG. 4D]
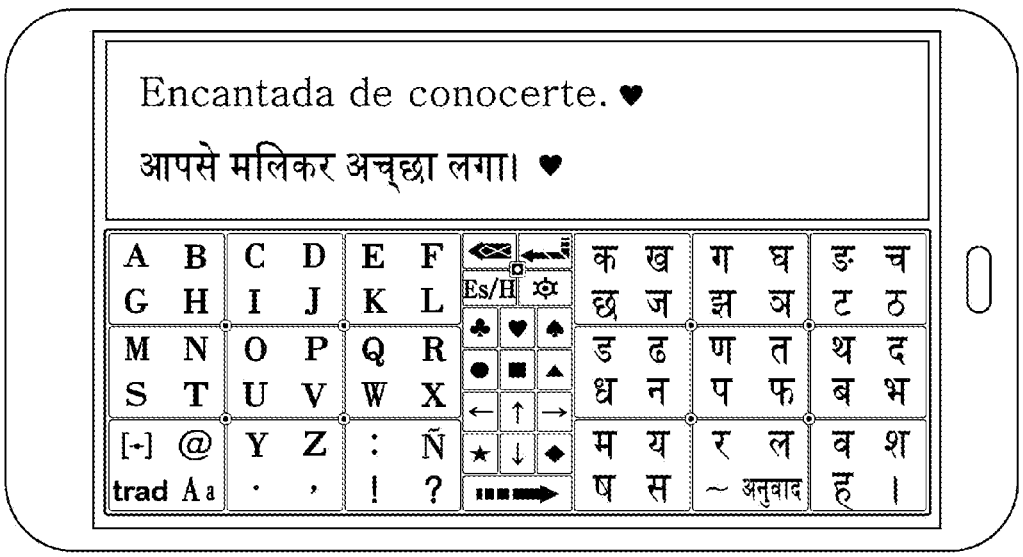

[FIG. 5A]
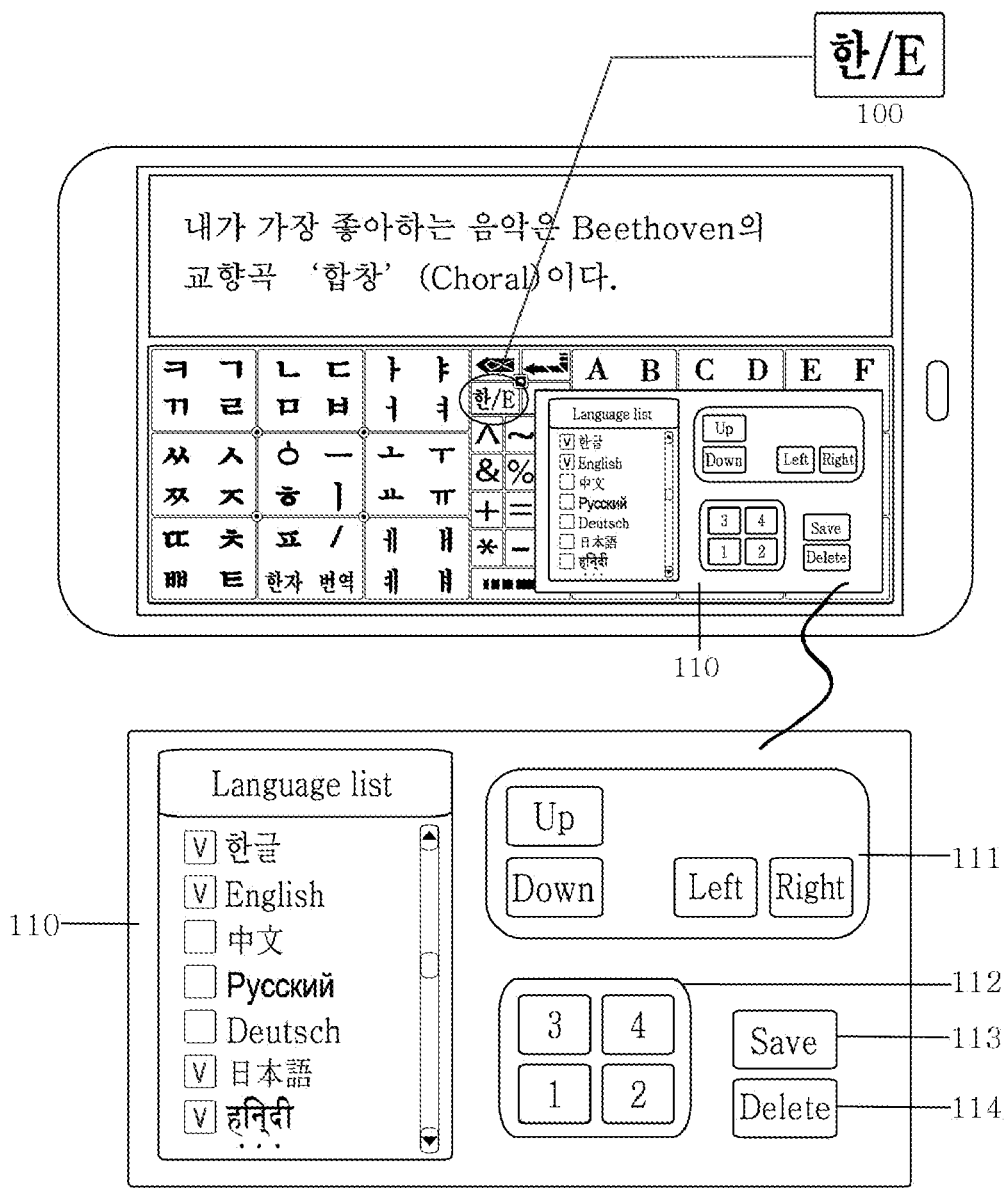

【FIG. 5B】

【FIG. 5C】
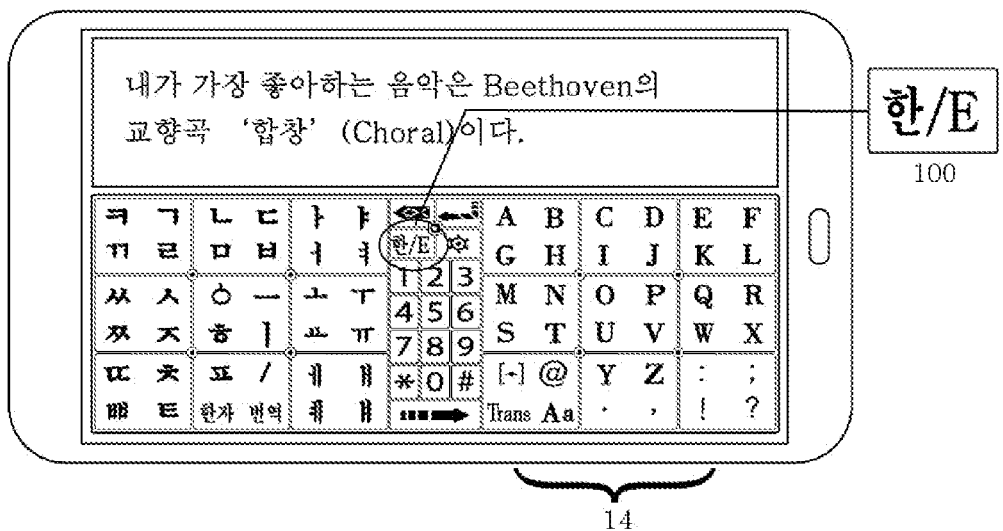
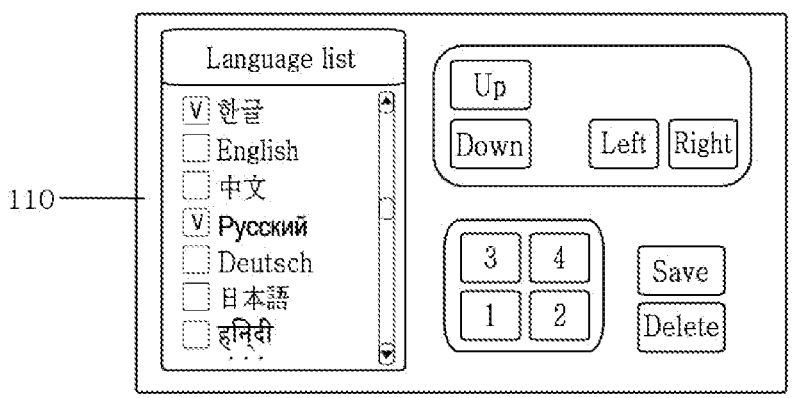
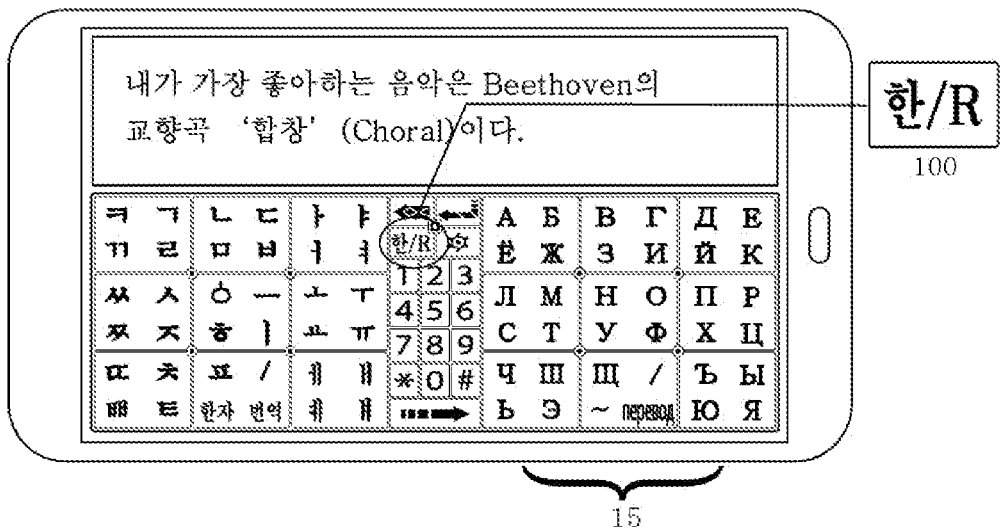

【FIG. 5D】
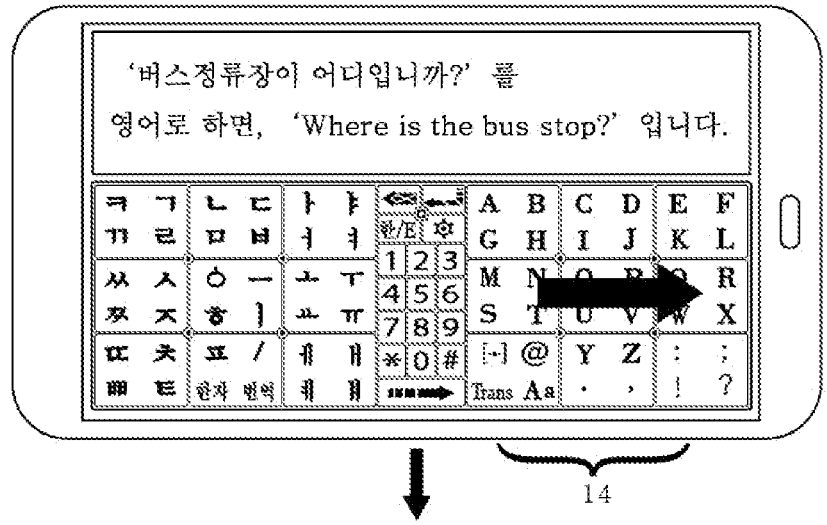
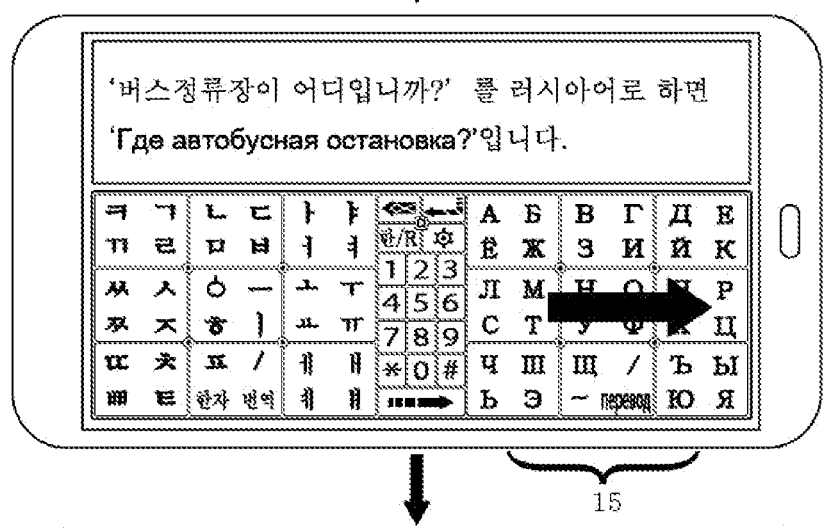
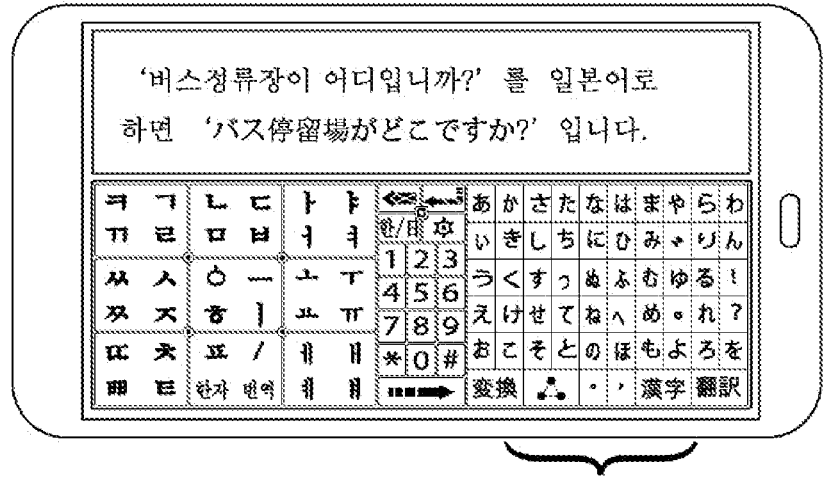

[FIG. 6A]
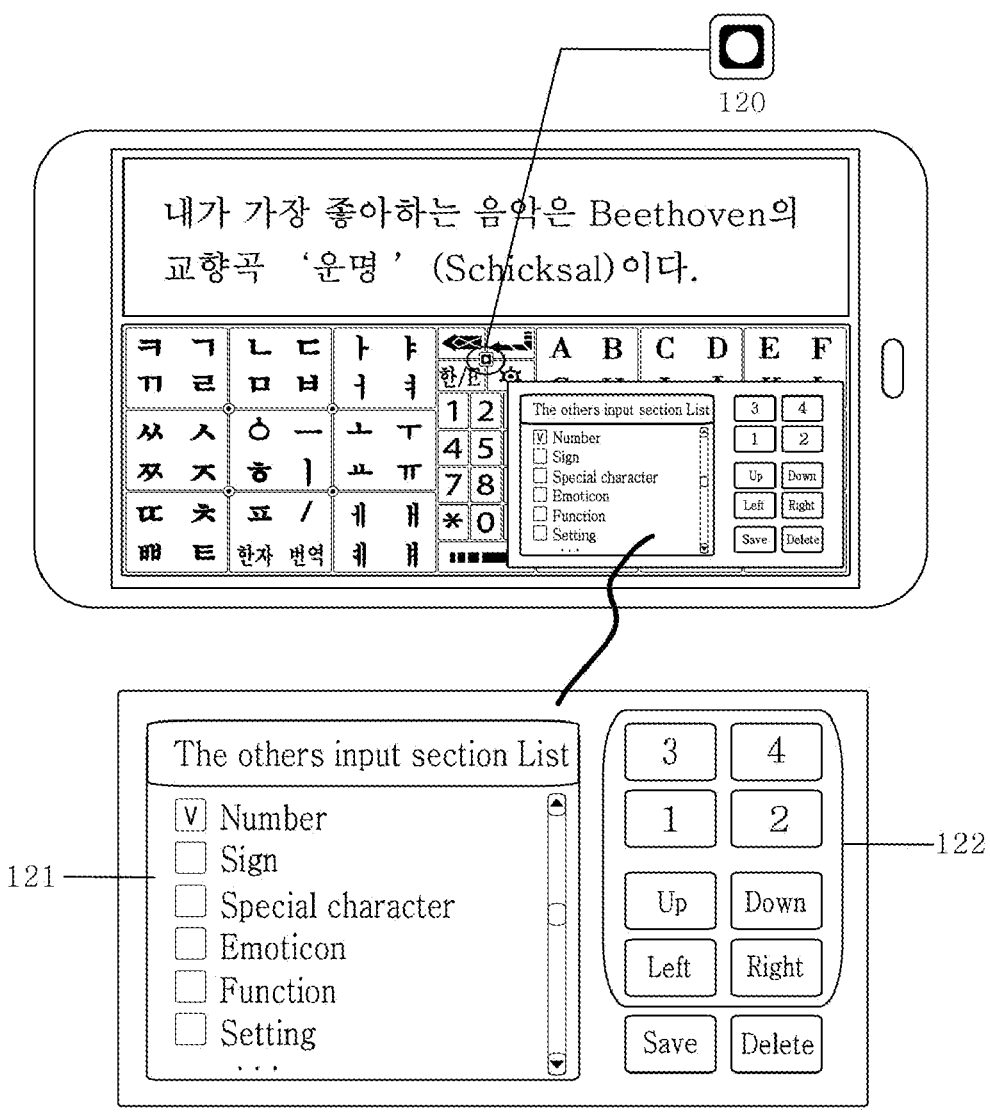

【FIG. 6B】
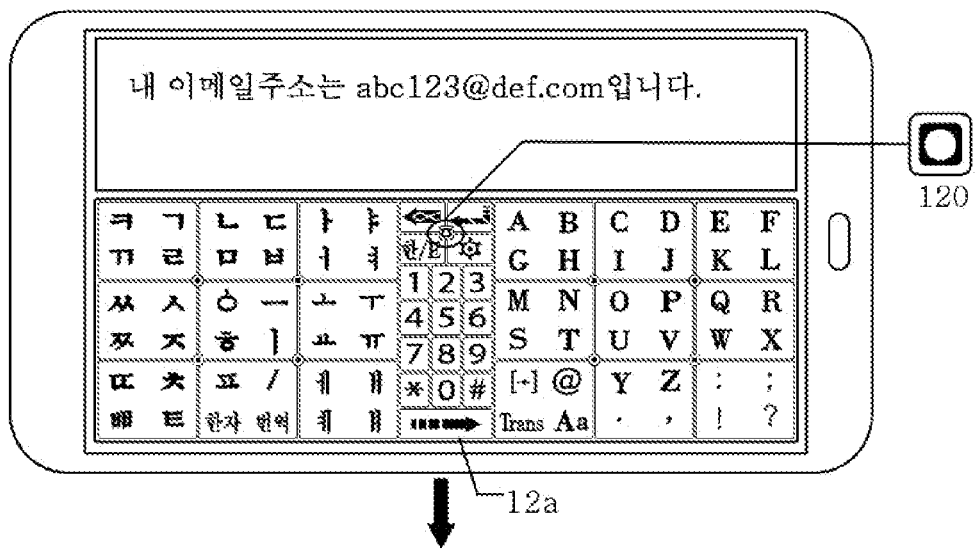
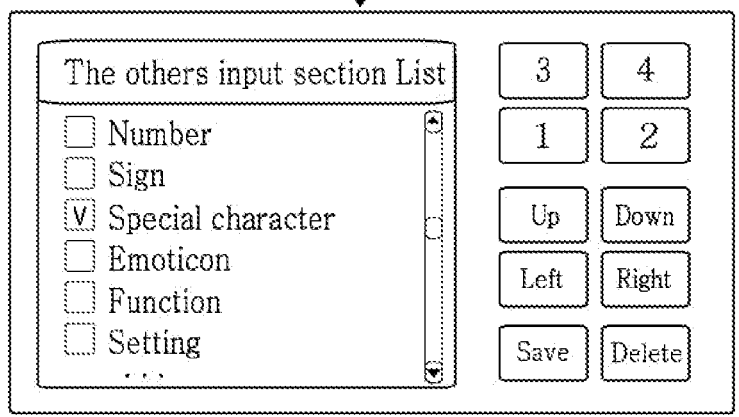

【FIG. 6C】
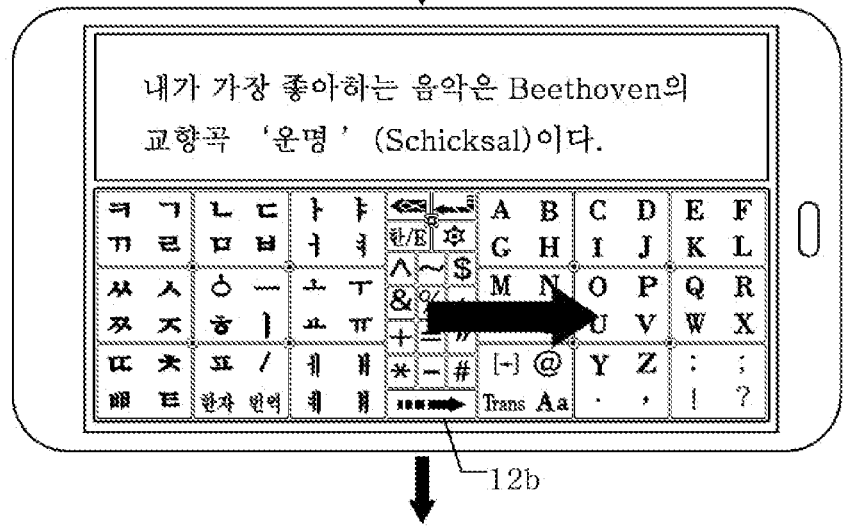

[FIG. 7]
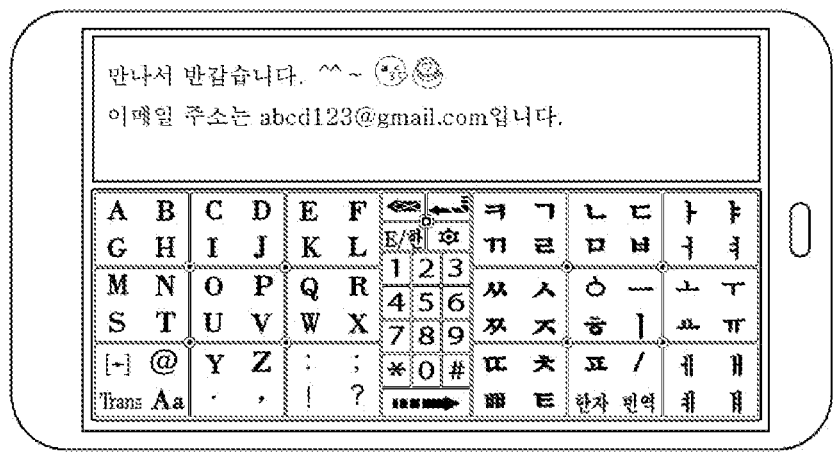

[FIG. 8]
[FIG. 9A]

【FIG. 9B】
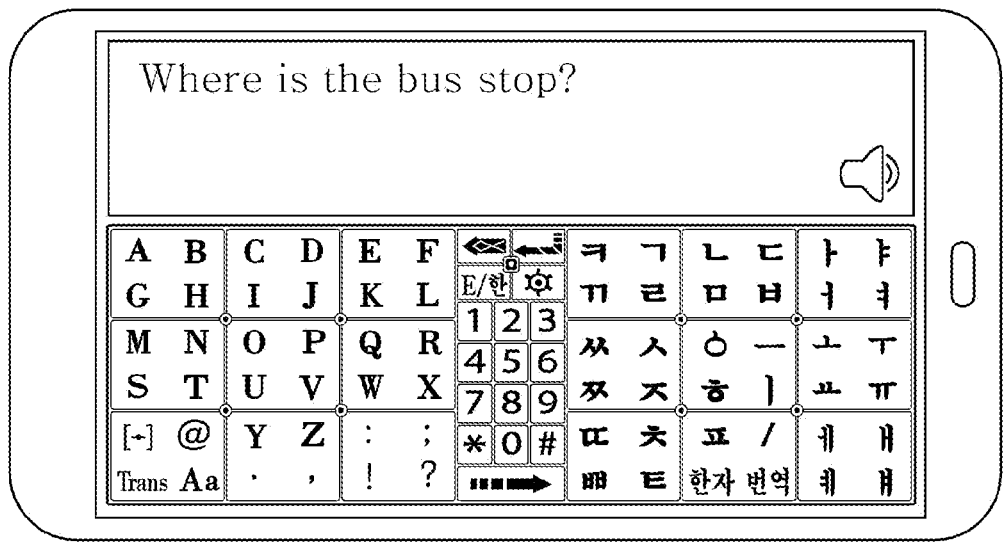
【FIG. 9C】
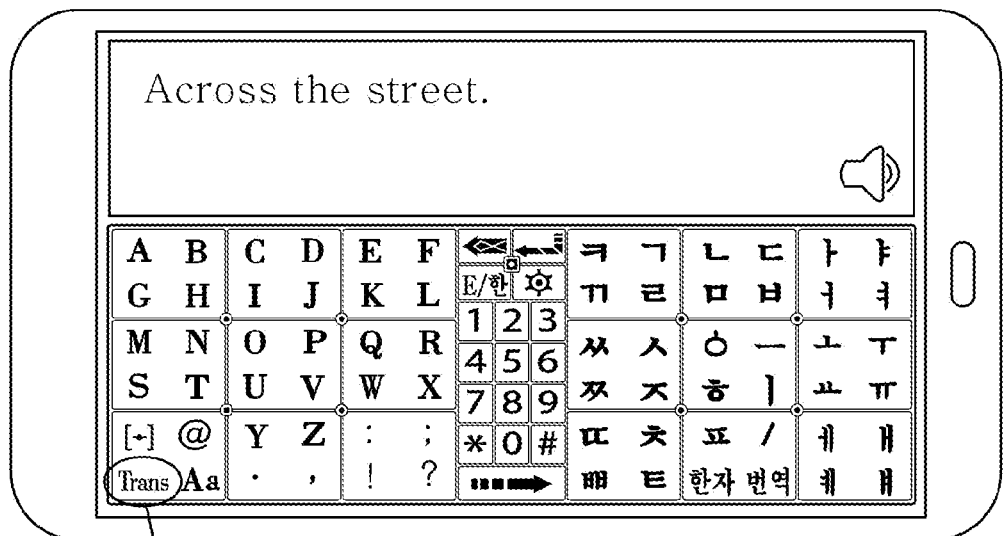

【FIG. 9D】
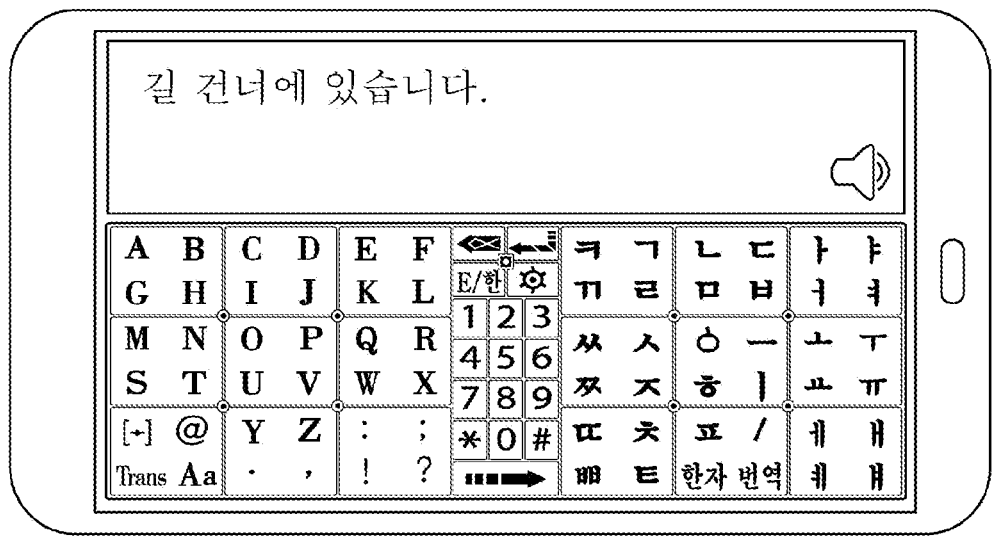
【FIG. 10A】
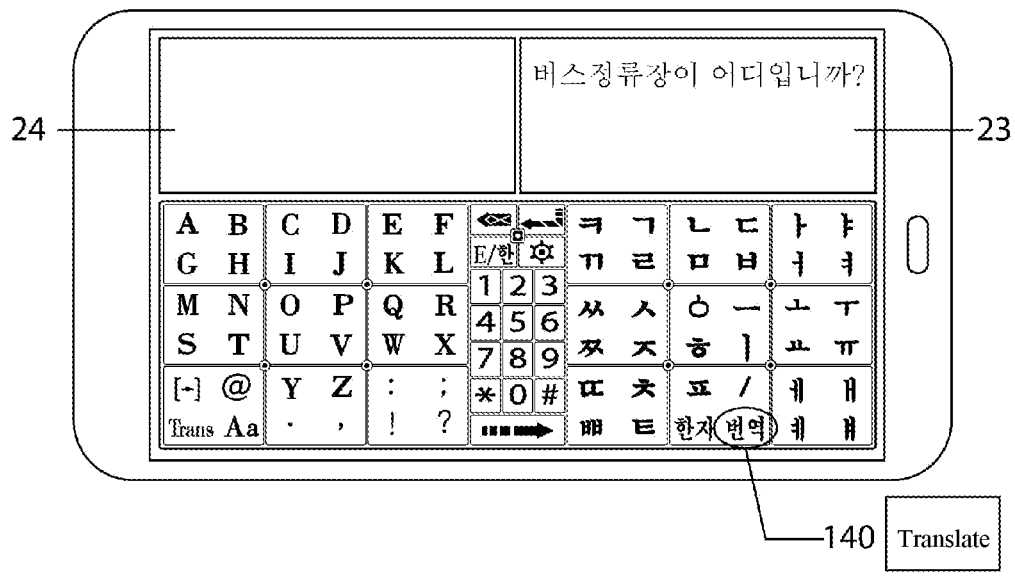

[FIG. 10B]
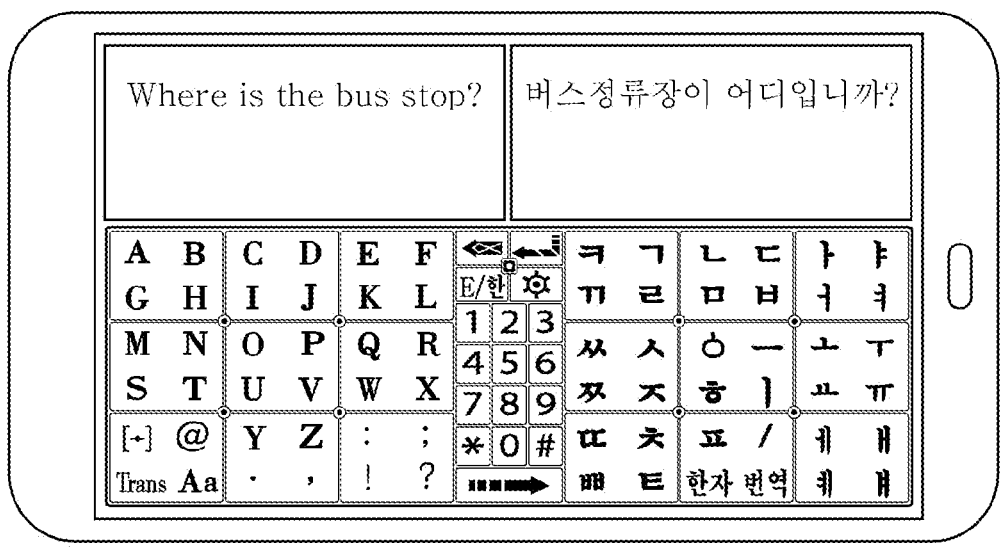

【FIG. 10C】
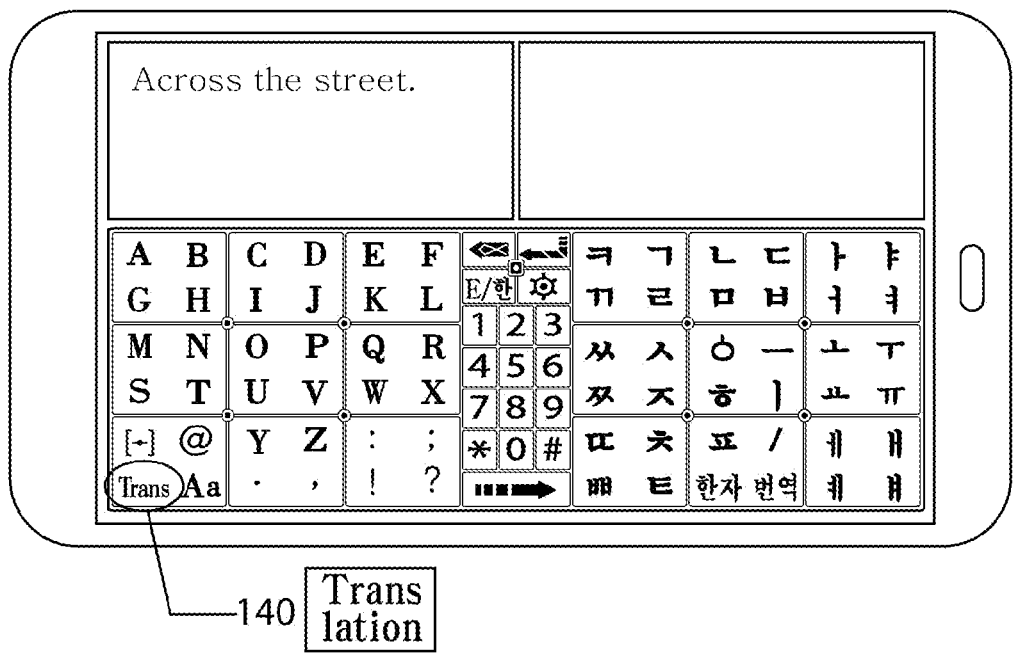
【FIG. 10D】
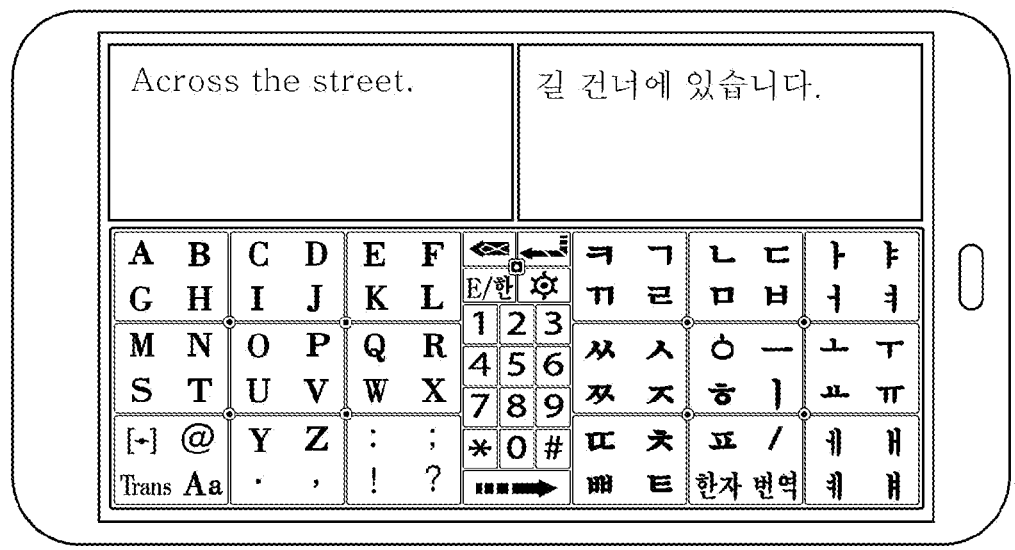

[FIG. 11A]
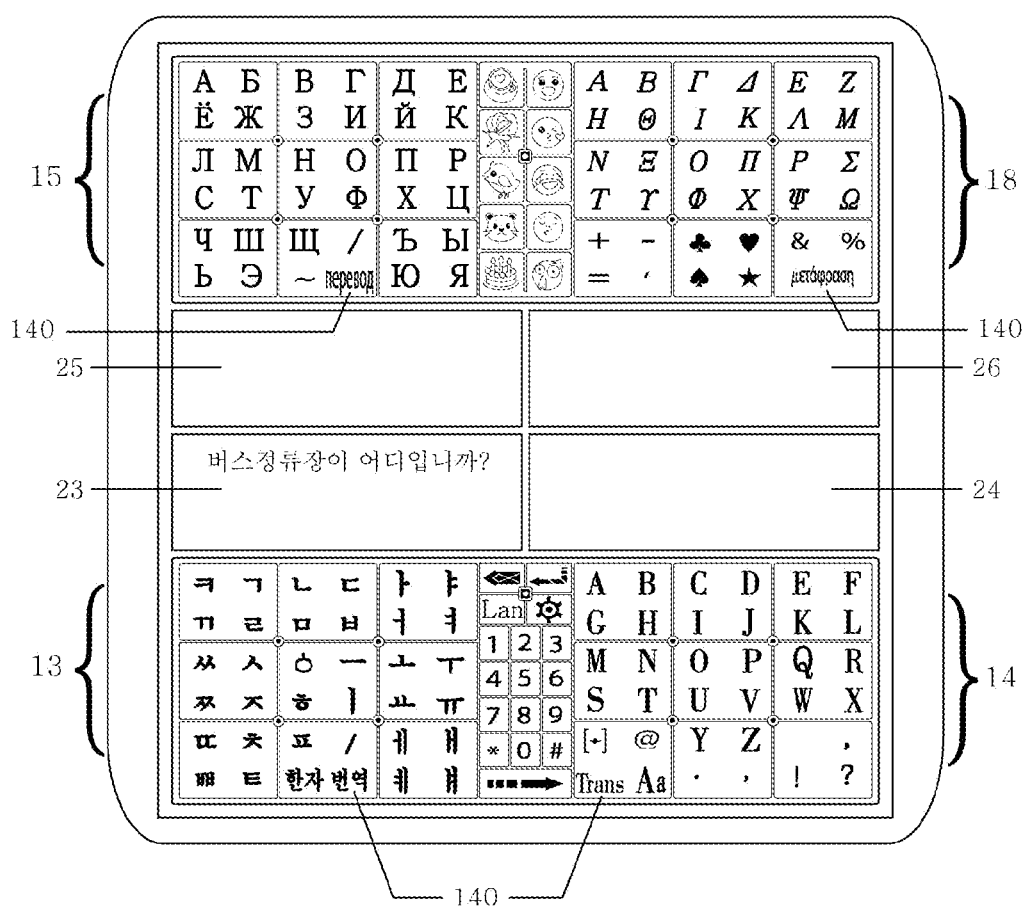

[FIG. 11B]
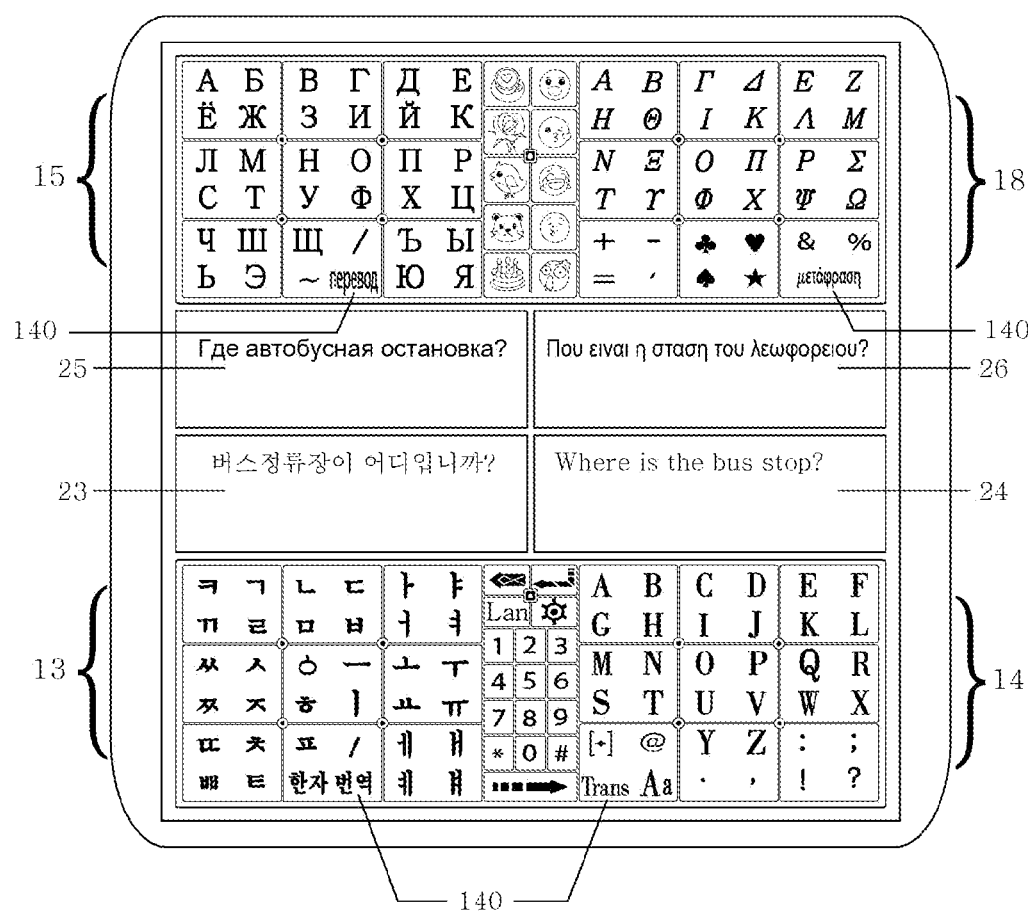

【FIG. 12A】
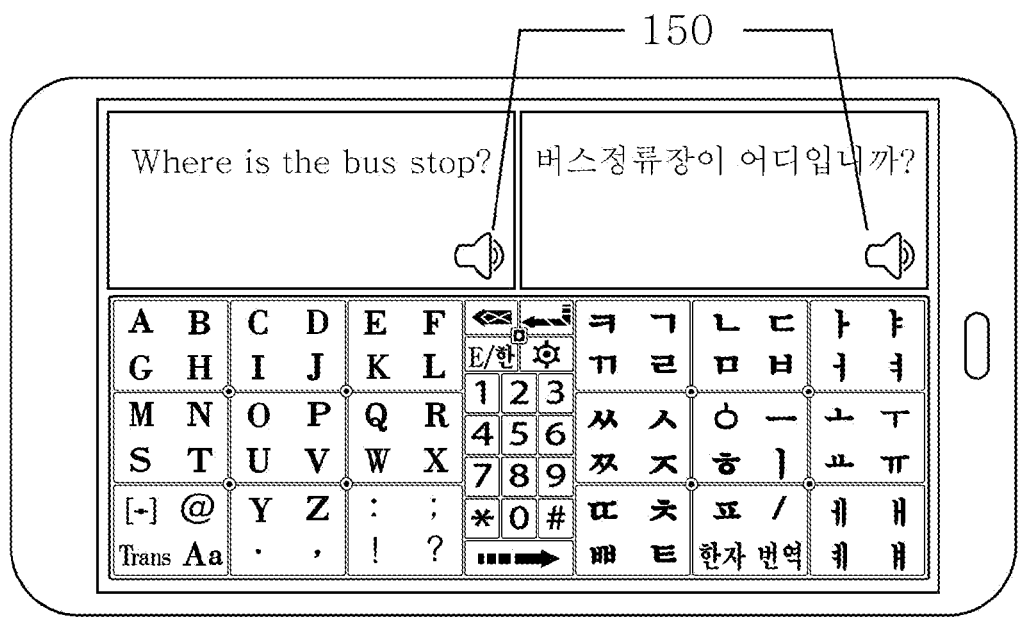

[FIG. 12B]
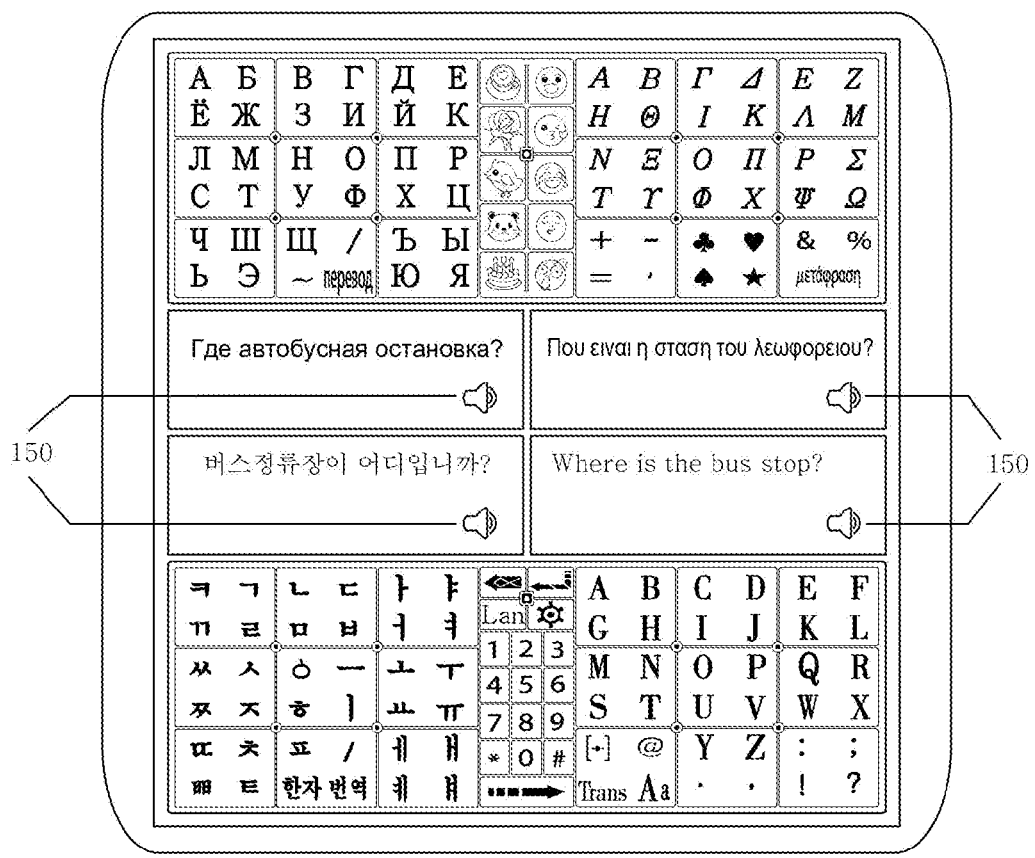

【FIG. 13】
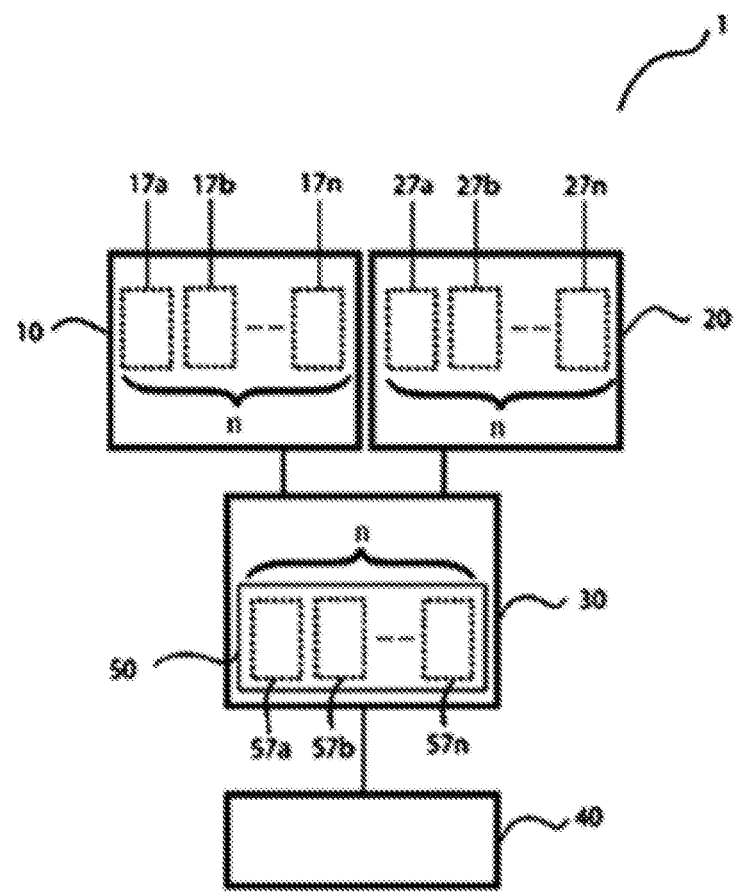

【FIG. 14A】

[FIG. 14B]

【FIG. 14C】
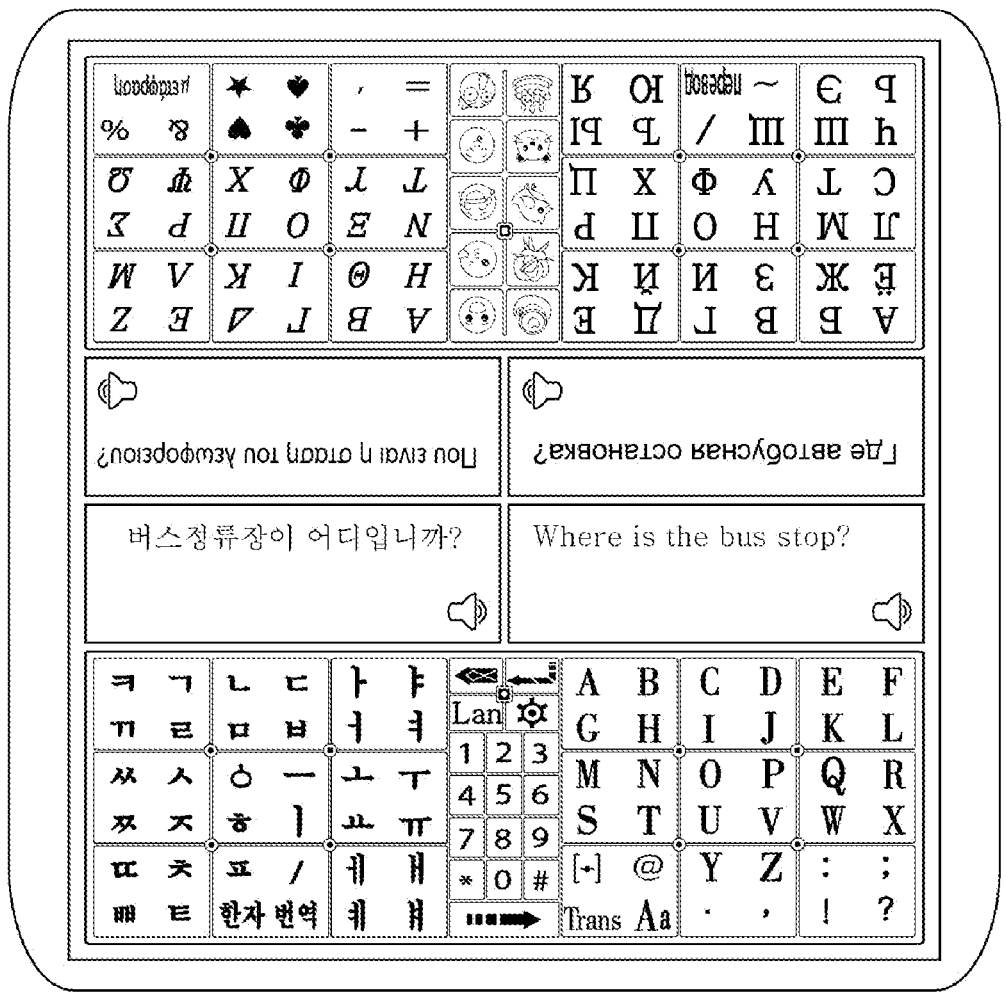

【FIG. 15】
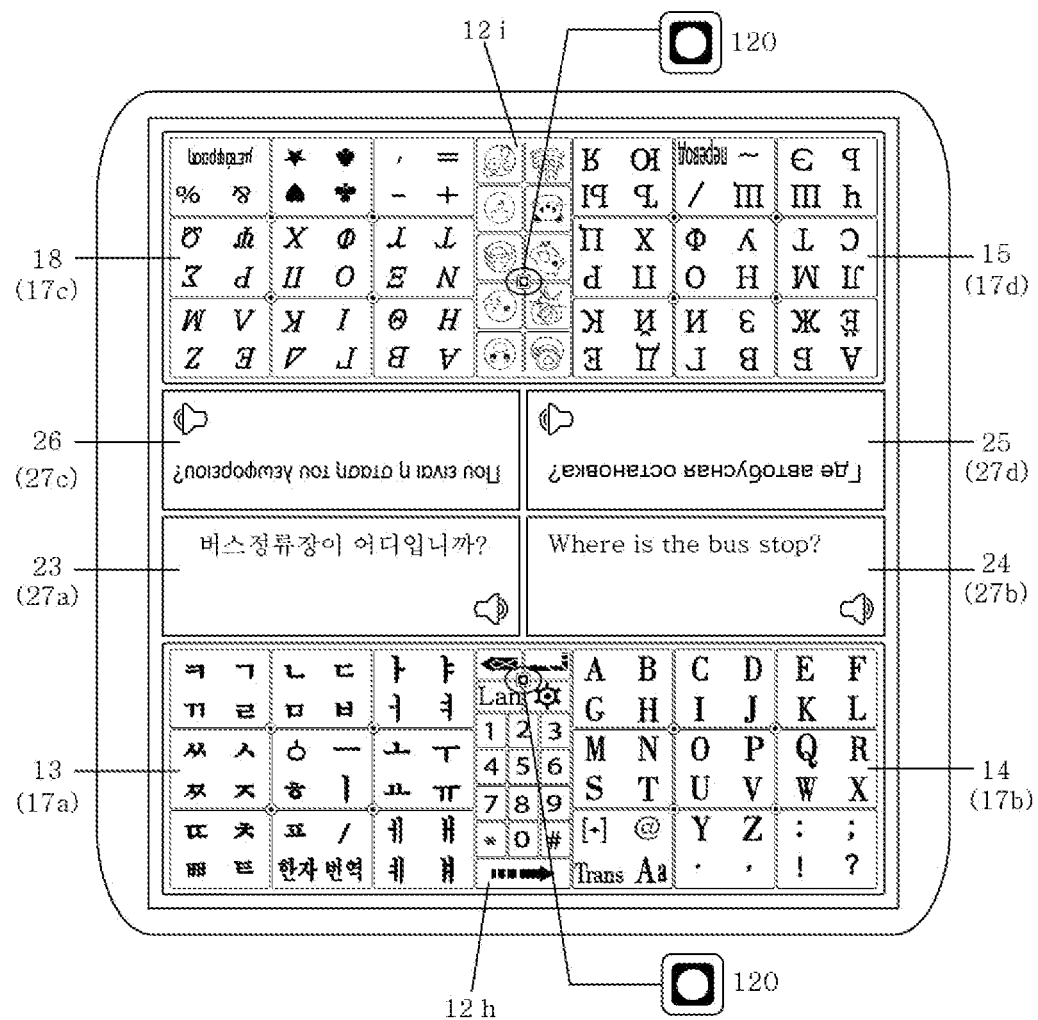
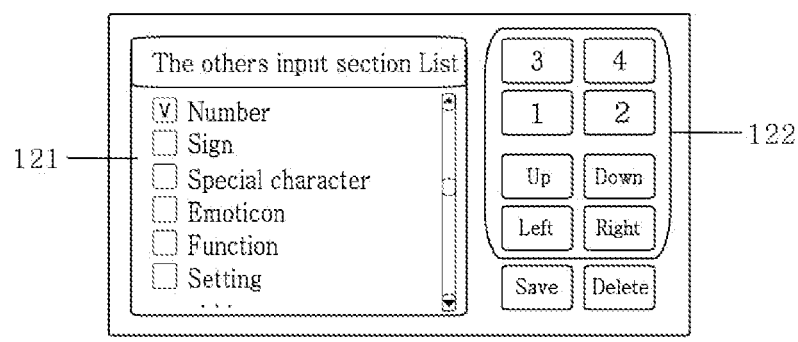

CHARACTER INPUT APPARATUS

TECHNICAL FIELD

The present disclosure relates to a character input apparatus, and more particularly, to a technique of inputting characters of two or more languages simultaneously without a language converting operation by continuously arranging two or more language input units and one or more miscellaneous input units when characters of a plurality of languages are input simultaneously.

BACKGROUND ART

When inputting characters of two languages, a related-art character input apparatus performs character input of a native language, executes a language conversion function of a character input unit to input characters of a foreign language, completely converts the character input unit in a foreign language form, and re-executes the language conversion function of the character input unit in order to return to the character input of the native language.

Since the related-art character input apparatus needs to execute the language conversion function of the character input unit when providing a character input of two languages, it is inconvenient for a user to repeatedly input the language conversion function of the character input unit, and there is a problem that a time required for inputting characters is increased.

Further, even though two languages are arranged at the same time, the related-art character input apparatus, performs a function to convert the language input unit into miscellaneous input units of numerals and symbols, in order to input other characters including one or more numerals, symbols, special characters, and emoticons or execute various function keys, setting keys, edition keys, and the like. In order to input the language, it is inconvenient for a user to convert the miscellaneous input unit into the language input unit again.

DETAILED DESCRIPTION OF THE DISCLOSURE

Technical Objects

In order to solve the aforementioned problem, the present disclosure has been made in an effort to provide a character input apparatus that inputs characters of two or more languages at the same time without language conversion by continuously arranging two or more language input units and one or more miscellaneous input units.

Technical Solution

In order to solve the technical problem, a character input apparatus according to the present disclosure includes: a character input unit for inputting of a character; and a character display unit for displaying the input character on a display, in which the character input unit is divided into a language input unit for inputting of a language character and a miscellaneous input unit in terms of a function and divided into a right character input unit, a left character input unit, an upper character input unit, a lower character input unit, and a central character input unit in terms of a layout, and two or more language input units and one or more miscellaneous input units are at all times arranged in the character input unit and characters of a plurality of languages are at all times displayed in the character input unit to efficiently input the characters of two or more languages at the same time without an operation of language conversion.

Advantageous Effects

The present disclosure has a remarkable effect in that two or more language input units and one or more miscellaneous input units are arranged continuously so as to simultaneously and completely input characters of two or more languages without language conversion, thereby enhancing operation efficiency by reducing operations required for the language conversion.

BRIEF DESCRIPTION OF DRAWINGS

The above and other aspects, and advantages of certain embodiments of the disclosure will be more apparent from the following description taken in conjunction with the accompanying drawings, in which:

FIG. 1 is a configuration diagram of a character input apparatus according to an embodiment of the present disclosure.

FIGS. 2A and 2B illustrate a configuration of a character input unit according to an arrangement relationship of a CEI character input unit.

FIGS. 3A to 3D illustrate examples of the configuration of a character input unit providing input of two languages.

FIGS. 4A to 4D illustrate other examples of the configuration of the character input unit providing the input of two languages according to a first embodiment.

FIGS. 5A to 5C illustrate examples of the configuration of a character input unit converting a language input unit by using a language function key according to a second embodiment.

FIG. 5D illustrates an example of a configuration of converting a language input unit in a slide scheme.

FIGS. 6A and 6B illustrate examples of a configuration of a miscellaneous input unit setting a key of miscellaneous input by using a setting key.

FIG. 6C illustrates an example of a configuration of converting the miscellaneous input unit in the slide scheme.

FIGS. 7A to 7C illustrate examples of a configuration of converting an arrangement of the language input unit.

FIG. 8 illustrates an example of the configuration of a character input unit including four language input units.

FIGS. 9A to 9D illustrate examples of the configuration of a character input unit translating a character input into the language input unit according to the first embodiment.

FIGS. 10A to 10D illustrate examples of the configuration of a character input unit translating a character input into the language input unit according to the second embodiment.

FIGS. 11A and 11B illustrate examples of a configuration of a character input unit translating a character input into a language input unit according to a third embodiment.

FIGS. 12A and 12B illustrate examples of a configuration of a character input unit translating a character input into a language input unit according to a fourth embodiment.

FIG. 13 illustrates an example of a configuration of an audio output unit outputting an input character as a sound.

FIGS. 14A to 14C illustrate examples of a configuration in which a language input unit and a character display unit are arranged according to a fifth embodiment.

FIG. 15 illustrates an example of a configuration in which a language input unit and a character display unit are arranged according to a sixth embodiment.

MODES FOR EMBODYING THE INVENTION

The above and other features and advantages of the disclosure will become more apparent by describing in detail exemplary embodiments thereof with reference to the attached drawings. In addition, the same reference numerals are assigned to the same or corresponding parts in each drawing, and redundant explanations are omitted.

Hereinafter, embodiments of the present disclosure will be described in detail with reference to the accompanying drawings and contents disclosed in the accompanying drawings.

FIG. 1 is a configuration diagram of a character input apparatus according to an embodiment of the present disclosure and the character input apparatus 1 may be one information communication device of a computer, a laptop, a smart phone, a tablet PC, an electronic notebook, a personal digital assistant (PDA), and a wearable terminal. The character input apparatus 1 includes a character input unit 10, a character display unit 20, a control unit 30, and a storage unit 40. The character input apparatus 1 may input characters in various schemes such as a button type, a touch type, and a hologram type and input characters using various input tools such as a keyboard, a mouse, and an input pen.

The character input unit 10 is for inputting of the character so that a user inputs the character and when the character is input, the character input unit 10 recognizes the character and transfers the recognized character to the control unit 30. The character includes a language character and miscellaneous characters. The language character may include languages of various countries, such as a native language and a foreign language and the miscellaneous characters include at least one of numerals, symbols, special characters, and emoticons.

The character input unit 10 displays a character key so that the user inputs the character and displays various function keys and setting keys for changing a type of each character key or an arrangement relationship of the character key and displays an edition key for editing the character.

The character display unit 20 displays an operation state of the character input apparatus 1 or displays the character that is input by the character input unit 10 on a display.

The control unit 30 controls operations of the character input unit 10 and the character display unit 20. The control unit 30 may control the operation of the character input unit 10 so as for registering, changing, or deleting each key of the character input unit and when receiving character recognition from the character input unit 10, the control unit 30 may control the character display unit 20 to display the corresponding character by using information stored in the storage unit 40.

The storage unit 40 may include at least one of a read only memory (ROM) and a random access memory (RAM) for storing multiple programs and data.

The storage unit 40 stores at least one of input information including character information such as a language, a language list, and miscellaneous characters displayed on the character input unit 10, a program for executing the operation of the character input unit 10, and data input from the character input unit 10. The character information is information on at least one of the language, the numeral, the symbol, the special character, and the emoticon. The program includes information to execute at least one of various function keys, setting keys, edition keys, and translation keys.

When the control unit 30 recognizes input of various function keys, setting keys, edition keys, or translation keys, the control unit 30 controls the operations of the character input unit 10 and the character display unit 20 using the program stored in the storage unit 40.

The storage unit 40 may upload and store characters in a data format produced by the user and the control unit 30 may control the operation of the character input unit 10 so as to register, change, or delete the produced or uploaded data by the user.

The character input unit 10 is composed of one or a plurality of Convenient input to Express an Idea and information diversely and freely (CEI) character input units 11. The CEI character input unit 11 means a convenient input unit for variously and freely representing an idea and information.

FIGS. 2A and 2B illustrate examples of a configuration of a character input unit according to an arrangement relationship of the CEI character input unit. The CEI character input unit 11 is functionally divided into a language input unit for inputting of a language character and one or more miscellaneous input units. Characters of a plurality of languages are at all times expressed in the character input unit by at all times arranging two or more language input units and one or more miscellaneous input units in the character input unit to efficiently input the characters of two or more languages at the same time without a language converting operation.

The CEI character input unit 11 in the character input unit 10 may be divided into a right character input unit 11a, a left character input unit 11b, an upper character input unit 11c, a lower character input unit 11d, and a central character input unit 11e in terms of a layout.

As illustrated in FIG. 2A, the character input unit 10 may arrange the right character input unit 11a, the left character input unit 11b, and the central character input unit 11e, arrange the right character input unit 11a, the left character input unit 11b, and the upper character input unit 11c, and arrange the right character input unit 11a, the left character input unit 11b, and the lower character input unit 11d.

As illustrated in FIG. 2B, the character input unit 10 may arrange the upper character input unit 11c, the lower character input unit 11d, and the central character input unit 11e, arrange the upper character input unit 11c, the lower character input unit 11d, and the right character input unit 11a, and arrange the upper character input unit 11c, the lower character input unit 11d, and the left character input unit 11b.

The character input unit 10 at all times arranges the language input unit and the miscellaneous input unit by a scheme illustrated in FIGS. 2A and 2B or at all times arranges the language input unit and the miscellaneous input unit by arrays of various combinations.

FIGS. 3A to 3D illustrate examples of a configuration of a character input unit providing input of two languages and the CEI character input unit 11 in the character input unit 10 is functionally divided into a language input unit for inputting the language character and one or more miscellaneous input units.

The character input unit 10 may be composed of two or more language input units and the language input unit may be languages of respective countries, which include a Korean input unit 13, a Chinese input unit, an English input unit 14, a Russian input unit 15, a Japanese input unit 16, a German input unit, a French input unit, a Spanish input unit, an Arabic input unit, a Hindi input unit 17, a Greek input unit 18, and the like.

The miscellaneous input unit may include at least one of miscellaneous character input unit providing input of miscellaneous characters, an edition input unit 12g for editing characters, a function input unit 12e for inputting language conversion and providing various functions, and a setting input unit 12f for setting a key of miscellaneous input or setting various environments of the character input. The miscellaneous character input units include at least one of the numeral, the symbol, the special character, and the emoticon and are divided into a numeral input unit 12a, a symbol input unit 12b, a special character input unit 12c, and an emoticon input unit 12d.

As illustrated in FIG. 3A, the character input unit may be arranged as the right character input unit 11a, the left character input unit 11b, and the central character input unit 11e. The right character input unit 11a may be the Korean input unit 13, the left character input unit 11b may be the English input unit 14, and the central character input unit 11e may be the numeral input unit 12a and the function input unit 12e.

As illustrated in FIG. 3B, the character input unit 10 may be arranged as the right character input unit 11a, the left character input unit 11b, and the central character input unit 11e. The right character input unit 11a may be the English input unit 14, the left character input unit 11b may be the Korean input unit 13, and the central character input unit 11e may be the symbol input unit 12b and the function input unit 12e.

As illustrated in FIG. 3C, the character input unit 10 may be arranged as the upper character input unit 11c, the lower character input unit 11d, and the central character input unit 11e. The upper character input unit 11c may be the English input unit 14, the lower character input unit 11d may be the Korean input unit 13, and the central character input unit 11e may be the numeral input unit 12a.

As illustrated in FIG. 3D, in the character input unit 10, the upper character input unit 11c is the Korean input unit 13, the lower character input unit 11d is the English input unit 14, and the central character input unit 11e is the symbol input unit 12b.

An example of inputting two languages in the related art is as follows. In order to input a sentence " 내가 좋아하는 음악은 Beethoven 의 교향곡 '합창'(Choral) 이다 ", " 내가 좋아하는 음악은 " is input in the Korean input unit, a function key for a language converting function is input to convert the Korean input unit into the English input unit, "Beethoven" is input in the English input unit, the function key for the language converting function is input to convert the English input unit into the Korean input unit, " 의 교향곡 " is input in the Korean input unit, the function key for the symbol converting function is input to convert the English input unit into the symbol input unit, and a single quotation mark is input in the symbol input unit. After inputting the function key for the language converting function again, the symbol input unit is converted into the Korean input unit to input "합창 " and converted into the symbol input unit again to input the single quotation mark and converted into the symbol input unit. Then, "(" is found and input, the symbol input unit is converted into the English input unit to input "Choral" and converted into the symbol input unit ")" and then, converted into the Korean input unit to input "이다 ". As described above, in the related art, since the character input unit needs to be continuously converted by repeatedly using the language converting and symbol converting functions, it may be very inconvenient and it takes long time to input characters.

The embodiment according to the present disclosure is as follows. As illustrated in FIG. 3B, when the sentence " 이다 Beethoven 의 교향곡 '합창' (Choral) 이다 ," is input, the Korean input unit 13, the English input unit 14, and the symbol input unit 12b are made to be displayed in the character input unit and the sentence may be input immediately. Therefore, it is not necessary to convert the character input unit, a conversion function is not used, and thus, the example sentence may be immediately and simply input without conversion of any character input unit and a time required for inputting the character may be shortened.

According to the present disclosure, when a parenthesis symbol is input, an integrated parenthesis key 130 may be utilized in the symbol input unit 12b. When the user presses the integrated parenthesis key 130 once, "(" is input, and if the user presses the integrated parenthesis key 130 once again, ")" is input and if the integrated parenthesis key 130 is pressed repeatedly (e.g., a double click, etc), '( )' may be continuously input.

A variety of parenthesis symbols such as '{ }', '[ ]', and '< >' are displayed in a set area when pressing the integrated parenthesis key 130 for a set time or 0.2 seconds or more is sensed. When the user selects a desired parenthesis symbol among the various parenthesis symbols, an open parenthesis symbol of the selected parenthesis symbol is input and then, when the user inputs a closed parenthesis symbol, the parenthesis symbol may be completed by pressing the integrated parenthesis key once.

According to the present disclosure, a space of the miscellaneous input unit may be efficiently used through the integrated parenthesis key 130, a process of finding the parenthesis symbol may be shortened when inputting various parenthesis symbols, and the closed parenthesis symbol may be immediately input by inputting a specific open parenthesis symbol among the parenthesis symbols displayed by pressing the integrated parenthesis key for a set time or more and then, pressing the integrated parenthesis key, and as a result, a simple input environment may be provided to the user.

In the present disclosure, when the user inputs a sentence "(Choral) 이다 ", the user inputs "(" by pressing the integrated parenthesis key 130 in the symbol input unit once, inputs "Choral" in the English input unit 14, and inputs ")" by pressing the integrated parenthesis key 130 in the symbol input unit once and inputs "이다 " in the Korean input unit, the characters are displayed in an order of inputting the characters in the character display unit, as it is.

FIGS. 4A to 4D illustrate other examples of the configuration of the character input unit for inputting of two languages according to a first embodiment and in the language input unit, languages of various global countries may be arranged, which include Chinese, Russian, Japanese, German, Spanish, Italian, French, Arabic, Hindi as well as Korean and English.

For example, in the language input unit, Chinese and Korean may be arranged as illustrated in FIG. 4A, Russian and German may be arranged as illustrated in FIG. 4B, French and Arabic may be arranged as illustrated in FIG. 4C, and Spanish and Hindi may be arranged as illustrated in FIG. 4D.

The character input unit 10 may include various input interfaces including at least one of a QWERTY type character input unit, a Cheonjiin character input unit, a Naratgeul character input unit, and a sky character input unit as well as the character input unit exemplified in the present disclosure.

The character input unit may provide a language function key 100 for inputting of language conversion in order to provide input of another language.

FIGS. 5A to 5C illustrate examples of the configuration of a character input unit converting a language input unit by using a language function key 100 according to a second embodiment and when the language function key 100 is input via the character input unit, the character input unit expresses a language list 110 for languages of various countries in the set area and allows language to be selected in the language list 110 for registering, changing, or deleting the language input unit.

The language function key 100 may be displayed as "한/E" or "한/R" button as illustrated in FIGS. 5A to 5C and transformed to various forms such as "한/口", "E/中", or "언어", "Lang", "Lan", "Language" in accordance with types of languages displayed on a character input unit, and so on and a position of the language function key 100 can be modified. For example, when a user who uses the character input apparatus 1 is an American and a primarily used foreign language is Korean, the language function key 100 may be displayed in the form of "E/K" or "E/한". Alternatively, a country name is abbreviated in English and KR, US, CN, JP, RU, ES, FR, DE, AE, IN, etc. may be used.

Like the example illustrated in FIG. 5A, when the selection input for Korean and English is received in the language list 110, the Korean input unit 13 and the English input unit 14 are displayed on the language input unit.

As illustrated in FIG. 5C, when the selection input for Korean and Russian is received in the language list, the Korean input unit 13 and the Russian input unit 15 are displayed on the language input unit.

When Korean and German are selected in the language list by such a method, the Korean input unit and the German input unit are displayed on the character input unit and when Chinese and Russian are selected in the language list, the Chinese input unit and the Russian input unit are displayed on the character input unit. When Korean, English, Russian, and Greek are selected in the language list, the Korean input unit, the English input unit, the Russian input unit, and the Greek input unit are displayed on the character input unit.

When the language function key 100 is input via the character input unit, the character input unit provides an input of a layout key 111 for arranging the language input unit at a location of an upper side, a lower side, a left side, or a right side. The layout key 111 may be displayed in the form of "up", "down", "left", and "right" as illustrated in FIG. 5A. For example, when the Korean input unit 13 is arranged on the left side and the English input unit is arranged on the right side as illustrated in FIG. 3B, and the user selects "Korean" in the language list 110, selects the layout key 111 displayed as "left", selects "English" in the language list and selects the layout key 111 displayed as "right" and then, presses a registration key 113.

The character input unit automatically arranges the language input unit according to an arrangement condition set in the order in which the language is selected when two or more languages are selected in the language list 110 and the layout key 111 is not input. For example, a language which is first selected is arranged on the upper side in upper and lower arrangements, and on the left side in left and right arrangements.

Further, when the user desires to use one language input unit only while using two or more language input units, the user may leave only one language name in the language list and select remaining language names to be deleted by pressing a deletion key 114.

As illustrated in FIG. 5C, when the user desires to convert the English input unit 14 to the Russian input unit 15, the user may press the language function key 100 to display the language list 110, deselect English and select Russian in the language list 110 and press the registration key 113 to convert the English input unit into the Russian input unit.

When the language function key 100 is input via the character input unit, the character input unit provides an input of a designation key 112 for designating an order in which the language input unit is arranged. The designation key 112 may be displayed in the form of "1", "2", "3", and "4" as illustrated in FIG. 5A.

When the user arranges the Korean input unit 13, the English input unit 14, the Japanese input unit 16, and the Hindi input unit 17 on the character input unit as illustrated in FIG. 5B, if the user selects "Korean" in the language list 110 illustrated in FIG. 5A and selects the designation key 112 of "1", selects "English" in the language list 110 and selects the designation key 112 of "2", selects "Japanese" in the language list 110 and selects the designation key 112 of "3", and selects "Hindi" in the language list 110 and selects the designation key 112 of "4", and presses the registration key in order, each language input unit is arranged at each location.

The character input unit automatically arranges the language input unit according to a designation condition set in the order in which the language is selected when two or more languages are selected in the language list 110 and the designation key 112 is not input.

FIG. 5D illustrates an example of a configuration of converting a language input unit in a slide scheme and the character input unit is changed to another language input unit when a sliding input in a predetermined direction including up, down, left, and right is detected in a state in which a predetermined point in an area of the language input unit is pressed down.

For example, in the character input unit, as illustrated in FIG. 5D, when the sliding input in the right direction is detected in a state in which a predetermined point in an area of the English input unit 14 is pressed down, the English input unit 14 is converted into the Russian input unit 15 to be displayed and when the sliding input is detected in the area of the Russian input unit 15 by the same scheme, the Russian input unit 15 is converted into the Japanese input unit 16 to be displayed.

In the character input unit, when the sliding input in the predetermined direction is detected in a state in which the predetermined point in the area of the language input unit is pressed down, the language input unit is converted in a set order in which the language list 110 is stored.

For example, the character input unit may be converted into a forward language input unit in the language list 110 when receiving the sliding input in the lower direction is received in the upper and lower sliding input and converted into a reverse language input unit in the language list 110 when receiving the sliding input in the upper direction. Further, the character input unit may be converted into a forward language input unit in the language list 110 when receiving the sliding input in the right direction is received in the left and right sliding input and converted into the reverse language input unit in the language list 110 when receiving the sliding input in the left direction.

The user may previously set a language frequently used in the language list 110, set the order of the language list 110, and newly register a new language input unit.

In the related art, for example, there is a sentence "한국어로 '만나서 반갑습니다' 는 영어로 'Nice to meet you.', 중국어로 '很高兴见到你.' 러시아어로 'Приятно познакомиться', 일본어로 'お会いできて嬉しいです', 스페인어로 'Encantado mucho gusto', 프랑스어로 'Je suis contente de vous rencontrer', 독일어로 'Schön, Sie kennen zu lernen' 힌디어로 'आपसे मिलकर अच्छा लगा।', and 아랍어로 'بمقابلتك تشرفت' 입니다". When this sentence is to be input, in the character input unit, "한국어로" is input in the Korean input unit, the Korean input unit is converted into the symbol input unit to input the single quotation mark, the symbol input unit is converted into the Korean input unit again to input "만나서 반갑습니다", the Korean input unit is converted into the symbol input unit to input the single quotation mark, the symbol input unit is converted into the Korean input unit again and then, "영어로" is input, the Korean input unit is converted into the symbol input unit to input the single quotation mark, the symbol input unit is converted into the English input unit and then, "Nice to meet you" is input, the English input unit is converted into the symbol input unit to input the single quotation mark and a comma, the symbol input unit is converted into the Korean input unit to input "중국어로", the Korean input unit is converted into the symbol input unit to input the single quotation mark, the symbol input unit is converted into the Chinese input unit to input "很高兴见到你.". Thereafter, the characters need to be input while continuously converting the Korean input unit and the symbol input unit, and the language input unit of each country. Therefore, there is a problem in that it is very inconvenient and it takes a long time to input characters.

However, in the present disclosure, for example, the character input units are arranged so as to continuously input two languages and the Korean input unit is arranged in the left input unit, the English input unit is arranged in the right input unit, and the symbol input unit is arranged in the central input unit and then, Korean and the symbol are directly input in the Korean input unit and the symbol input unit and English is input in the English input unit and then, when Korean and the symbol are continuously input while the Korean input unit and the symbol input unit are just left without conversion, the right language input unit is converted from the English input unit into the Chinese input unit, the Russian input unit, the Japanese input unit, the Spanish input unit, the French input unit, the German input unit, the Hindi input unit, the Arabic input unit, and the like, to input Korean and the symbol. In this case, the right input unit may be converted by using the language function key or easily converted by pressing and sliding a certain point. As described above, by using the present disclosure, the number of converting the character input unit may be remarkably reduced and thus, the input time may be shortened and input efficiency may be increased at the time of inputting the characters.

In the present disclosure, for example, in order to input the aforementioned example, when the Korean input unit is arranged in a first character input unit, the English input unit is arranged in a second character input unit, the Chinese input unit is arranged in a third character input unit, the Russian input unit is arranged in a fourth character input unit, and the symbol input unit is arranged in the miscellaneous input unit by arranging the input units so as to continuously input four languages, four languages may be directly input without converting the character input unit even once until the sentence "한국어로 '만나서 반갑습니다' 는 영어로 'Nice to meet you.', 중국어로 '很高兴见到你.', 러시아어로 'Приятно познакомиться' is input. Thereafter, after the English input unit, the Chinese input unit, and the Russian input unit are converted into the Japanese input unit, the Spanish input unit, and the French input unit at once by using the language function key, a sentence "일본어로 'お会いできて嬉しいです', 스페인어로 'Encantado mucho gusto', 프랑스어로 'Je suis contente de vous rencontrer'" may be input and similarly even in this case, Korean, symbols, Japanese, Spanish, and French may be all input at the same time without converting the character input unit even once. The language input unit may be converted by using the language function key and the language input unit may be converted into another language input unit by pressing down and sliding a certain point of each language input unit. Thereafter, by using the language function key, the language unit may be converted into each of the Japanese input unit, the Spanish input unit, and the French input unit into the German input unit, the Hindi input unit, and the Arabic input unit at the same time and the sentence "독일어로 'Schön, Sie kennen zu lernen', 힌디어로 'आपसे मिलकर अच्छा लगा।', and 아랍어로 'بمقابلتك تشرفت' 입니다" may be input. Even in this case, all of Korean, the symbol, German, Hindi, and Arabic may be simultaneously input without converting the character input unit even once.

FIGS. 6A and 6B illustrate examples of a configuration of the miscellaneous key unit for setting a key related to the miscellaneous input by using a setting key. When the setting key 120 is input via the miscellaneous input unit, a miscellaneous list 121 for one or more keys related to the miscellaneous inputs including at least one of a numeral input unit 12a, a symbol input unit 12b, a special character input unit 12c, an emoticon input unit 12d, an edition input unit 12g, a function input unit 12e, and a setting input unit 12f is displayed in a set area and selection of the miscellaneous inputs is provided in the miscellaneous list 121 for registering, changing, or deleting the keys. For example, the miscellaneous input unit may display the numeral input unit 12a when "numeral" in the miscellaneous list 121 is selected.

FIG. 6B illustrates an example of displaying a special character input unit by pressing the setting key 120 and selecting the special character in the miscellaneous list 121.

In the present disclosure, the miscellaneous input unit may be converted in an order in which the miscellaneous input unit is registered in the miscellaneous list 121, the key of the miscellaneous input which is frequently used may be previously set, the miscellaneous input units may be registered by changing the order of the miscellaneous input units according to a need of the user, and the miscellaneous input unit required by the user may be newly registered. Further, in the present disclosure, according to the need of the user, the language input unit may be converted into the miscellaneous input unit and the miscellaneous input unit may be converted into the language input unit.

FIG. 6C illustrates an example of a configuration of converting the miscellaneous input unit in the slide scheme. The character input unit is changed to another miscellaneous input unit when a sliding input in a predetermined direction including up, down, left, and right is detected in a state in which a predetermined point in an area of the miscellaneous input unit is pressed down.

As illustrated in FIG. 6C, when the sliding input in the right direction is detected in a state in which a predetermined point in an area of the numeral input unit 12a is pressed down, the numeral input unit 12a is converted into the symbol input unit 12b to be displayed and when the sliding input is detected in the area of the symbol input unit 12b by the same scheme, the symbol input unit 12b is converted into the special character input unit 12c to be displayed.

In the character input unit, when the sliding input in the predetermined direction is detected in a state in which the predetermined point in the area of the miscellaneous input unit is pressed down, the miscellaneous input unit is converted in a set order in which the miscellaneous input unit is stored in the miscellaneous list 121.

For example, the character input unit may be converted into a forward miscellaneous input unit in the miscellaneous list 121 when the sliding input in the lower direction is detected in the upper and lower sliding input and converted into a reverse miscellaneous input unit in the miscellaneous list 121 when the sliding input in the upper direction is detected. Further, the character input unit may be converted into the forward miscellaneous input unit in the miscellaneous list 121 when the sliding input in the right direction is detected in the left and right sliding input and converted into the reverse miscellaneous input unit in the miscellaneous list 121 when the sliding input in the left direction is detected.

As described above, in the present disclosure, since the language input unit or the miscellaneous input unit may be simply and rapidly converted into another language input unit or another type of miscellaneous input unit by pressing the language function key or the setting key, languages and other characters of various countries may be variously input and edited while converting the languages and other characters more rapidly and easily as well as two languages. By utilizing such a method, when two languages are input, while the language input units of two languages are at all times displayed on the character input unit, the numerals, the symbols, the special characters, the emoticons, the functions, setting, edition, and the like may be variously utilized by converting the miscellaneous input unit from time to time as necessary to enhance input speeds of two languages and more rapidly and completely input two languages. The same is applied when two or more languages are input.

According to the present disclosure, the user may change, register, or delete a character key of the language input unit or the miscellaneous input unit and data produced by the user may be registered and used like the character. For example, when the user presses the key of the language input unit or the miscellaneous input unit for a set time, the user may change the pressed key and register, change, and delete data produced or uploaded by the user. The set time may be 0.2 seconds or more.

FIGS. 7A to 7C illustrate examples of a configuration of converting an arrangement of the language input unit and when the language function key 100 is input via the character input unit, the character input unit displays the language list 110 for languages of various countries in the set area and allows language to be selected in the language list 110 for registering, changing, or deleting the language input unit.

For example, when the user deselects English in the language list 110, one language input unit composed of Korean is displayed as illustrated in FIG. 7B and when the user deselects Korean, one language input unit composed of English is displayed as illustrated in FIG. 7C while two language input units constituted by Korean and English are displayed as illustrated in FIG. 7A.

According to the present disclosure, in the case where one language is primarily input while inputting the characters of two languages occurs, only one language input unit is displayed to increase visibility and perception of the language input unit and spatial utilization of the display is increased to enhance character input efficiency.

Further, according to the present disclosure, only one language input unit is displayed to variously arrange various keys of the miscellaneous input unit. For example, as illustrated in FIGS. 7B and 7C, the symbol input unit 12b may be arranged at the left side of the language input unit, the numeral input unit 12a may be arranged at the right side of the language input unit, and the emoticon input units 12d may be arranged at both ends of the display. When the character input unit receives the sliding input in a predetermined direction including up, down, left, and right in a state in which a predetermined point in the area of the miscellaneous input unit is pressed down, the character input unit may be changed to another miscellaneous input unit. The emoticon input unit may be slid up or down or left or right to show various emoticons.

FIG. 8 illustrates an example of the configuration of a character input unit including four language input units and since the character input apparatus 1 includes four language input units, the character input apparatus 1 may be used in an information communication device having a larger liquid crystal display size than a smart phone.

The character input unit 10 includes a language input unit composed of the Korean input unit 13, the English input unit 14, the Japanese input unit 16, and the Hindi input unit 17 and a miscellaneous input unit composed of the numeral input unit 12a and the emoticon input unit 12d and four languages may be rapidly and efficiently input without language conversion while maintaining four languages without converting the character input unit when inputting four languages.

For example, the character input unit 10 may input a sentence "'버스정류장이 어디입니까?' 를 영어로 하면 'Where is the bus stop?' 이고, 일본어로 하면 'バス停留場がどこですか?' 이고, 일본어로 하면 'बस स्टॉप कहाँ है?' 입니다" Here, the character input unit 10 may rapidly, efficiently, and completely input the characters of four languages without language conversion and without converting the character input unit even once.

FIGS. 9A to 9D illustrate examples illustrating the configuration of a character input unit translating a character input into the language input unit according to the first embodiment and when a translation key 140 is input via the character input unit 10 in a state in which the character is input via one language input unit, the character input via one language input unit is translated into languages corresponding to the other language input units.

The control unit 30 recognizes the inputs of two language input units at all times arranged in the character input unit 10, recognizes the input of the translation key 140 and executes a translation program stored in the storage unit 40, and controls the translated language to be displayed in the character display unit 20.

The character input unit 10 may include two language input units and one miscellaneous input unit like the examples illustrated in FIGS. 9A to 9D, the language input unit may include the Korean input unit 13 which is the right character input unit and the English input unit 14 which is the left character input unit, and the miscellaneous input unit may be the numeral input unit 12a.

Like the examples illustrated in FIGS. 9A to 9D, when the translation key 140 is input via the character input unit 10 in a state in which Korean characters are input, the Korean characters are translated into English characters and when the translation key 140 is input via the character input unit 10 in a state in which the English characters are input, the English characters are translated into the Korean characters.

When a Korean has a conversation with an American, the Korean may set two language input units as the Korean input unit 13 and the English input unit 14, the Korean press the translation key 140 by inputting the characters in Korean input unit 13, the American may verify the English characters translated and displayed in the character display unit 20, the American press the translation key 140 by inputting the characters in English in the English input unit 14, and Korean verify the Korean characters translated and displayed in the character display unit 20.

For example, when the Korean inputs "버스정류장이 어디입니까?" via the Korean input unit 13 and then, presses the translation key 140, the input Korean is translated into English and "Where is the bus stop?" is displayed in the character display unit 20. When the American inputs "Across the street." via the English input unit 14 and then, presses the translation key 140, the input English is translated into Korean and "길 건너에 있습니다" is displayed in the character display unit 20.

According to the present disclosure, when the user studies foreign languages or performs translation, or interpretation of foreign languages, the user may use the character input apparatus 1 which mutually translates two languages to grasp a meaning while comparing the native language and the foreign language with each other frequently. In addition, the user may immediately utilize the character input apparatus when doing interpretation for foreigners.

As described above, according to the present disclosure, since characters of a plurality of languages may be simultaneously input without converting the character input unit by continuously the characters of the plurality of languages to the character input unit, the user may show mutual languages while translating the mutual languages when having a conversation with a foreigner to clearly deliver mutual opinions. Thus, the user may communicate with persons who do not know languages of the other party.

When the translation key 140 is input via the character input unit 10 for a set time in a state in which the character is input via one language input unit, the language list 110 may be displayed in a set area and when a specific language is selected in the language list 110, the input character is translated into a character of a selected language. The set time may be 0.2 seconds or more.

For example, when the translation key 140 is input via the character input unit 10 for a set time in a state in which the Korean character is input via the Korean input unit 13, the language list 110 except for Korean may be displayed in a set area and when "German" is selected in the language list 110, the input character is translated into a German character.

According to the present disclosure, when the character input apparatus 1 receives the input of the translation key 140 for the character of one language input unit while two language input units are continuously arranged, the input character is translated into a language of the other one language input unit and when the character input apparatus 1 receives the input of the translation key 140 for a set time, the language list 110 is displayed so as to translate the input character into languages other than two language input units to enhance translation functionality.

FIGS. 10A to 10D illustrate examples of the configuration of a character input unit for translating a character input into the language input unit according to the second embodiment and the character display unit 20 is divided into one or more character display units with the same number as the number of language input units and when the respective language input units and the divided character display units are matched one by one and characters are input in the respective language input units, the characters of the corresponding language are input in the character display unit corresponding to each language input unit.

According to the present disclosure, the character input unit may include n language input units and n character display units (n is a natural number) and an n-th language input unit and an n-th character display unit may correspond to each other, and a character input in the n-th language input unit may be input in the n-th character display unit, respectively.

When the translation key 140 is input via the character input unit 10 in a state in which the characters are input in the language of one language input unit, the language characters input as the language of one language input unit is collectively translated into language characters of the other language input units and the collectively translated language characters are classified by a language of each of the other language input units and the divided character display units matched with each of the other language input units display the classified language characters. Each of the numbers of language inputs unit and character display units 20 may be two as illustrated in FIGS. 10A to 10D. The character display unit 20 is divided into a Korean language display unit 23 and an English language display unit 24 when the character input unit is composed of the Korean input unit 13 and the English input unit 14. Here, the Korean input unit 13 may be referred to as a first language input unit 17*a*, the Korean language display unit 23 may be referred to as a first character display unit 27*a*, the English input unit 14 may be referred to as a second language input unit 17*b*, and the English display unit 24 may be referred to as a second character display unit 27*b*. When the character is input via the Korean input unit 13, the Korean characters input in the Korean character display unit 23 are displayed and when the character is input via the English input unit 14, the English characters input in the English display unit 24 are displayed.

When the translation key 140 is input while the Korean characters are input in the Korean input unit 13, the English characters into which the Korean characters are translated are displayed in the English display unit 24 and when the translation key 140 is input in a state in which the English characters are input via the English input unit 14, the Korean characters into which the English characters are translated are displayed in the Korean display unit 23.

For example, when "버스정류장이 어디입니까?" is input via the Korean input unit 13, the input Korean characters are displayed in the Korean display unit 23 and when the translation key 140 is input, the English characters into which the Korean characters are translated, "Where is the bus stop?" is displayed in the English display unit 24. When "Across the street." is input via the English input unit 14, the input English characters are displayed in the English display unit 24 and when the translation key 140 is input, the Korean characters into which the English characters are translated, "길 건너에 있습니다." is displayed in the Korean display unit 23.

FIGS. 11A and 11B illustrate examples of a configuration of a character input unit translating a character input into a language input unit according to a third embodiment and the numbers of language input units and character display units 20 corresponding thereto may be four, respectively.

When the character display unit 20 includes the Korean input unit 13, the English input unit 14, the Russian input unit 15, and the Greek input unit 18 as illustrated in FIGS. 11A and 11B, the character display unit 20 may be divided into the Korean display unit 23, the English display unit 24, the Russian display unit 25, and the Greek display unit 26. When the user inputs the characters via the Korean input unit 13 which is the first language input unit, Korean is displayed in the Korean display unit 23 which is the first character display unit and when the user inputs the characters via the English input unit 14 which is the second language input unit, English is displayed in the English display unit 24 which is the second character display unit. Similarly, when the user inputs the characters via the Russian input unit which is the third language input unit, Russian is displayed in the Russian display unit which is the third character display unit and when the user inputs the characters via the Greek input unit which is the fourth language input unit, Greek is displayed in the Greek display unit which is the fourth character display unit.

When the translation key 140 is input in a state in which the Korean characters are input to the Korean input unit 13, the input Korean characters are collectively translated into the languages of the English input unit 14, the Russian input unit 15, and the Greek input unit 18 and the collectively translated characters are classified by a language of each of the other language input units and displayed in the English display unit 24, the Russian display unit 25, and the Greek display unit 26, respectively.

As illustrated in FIG. 11A, when the user inputs "버스정류장은 어디입니까?" via the Korean input unit, the contents are displayed in the Korean display unit and when the user presses the translation key 140, the control unit controls to translate Korean into the languages corresponding to the other language input units, respectively and display the translated languages on the character display units corresponding to the languages, respectively. Therefore, as illustrated in FIG. 11B, the input contents are translated into English and displayed as "Where is the bus stop?" in the English display unit, translated into Russian and displayed as "Где автобусная остановка?" in the Russian display unit, and translated into Greek and displayed as "Που ειναι η σταση του λεωφορειου?" in the Greek display unit.

According to the present disclosure, the user may efficiently learn or translate multiple languages by using a batch translation function, and when people of different nationalities have a conversation, they translate their languages and show the translated languages to each other, thus capable of clearly delivering mutual opinions and communicating with persons who do not know languages of other parties. Therefore, the present disclosure may be used to facilitate smooth communication among people around the world.

FIGS. 12A and 12B illustrate examples of a configuration of a character input unit translating a character input into a language input unit according to a fourth embodiment and the character display unit 20 includes a speaker key 150 causing a sound output of the input language character.

FIG. 13 illustrates an example of a configuration of an audio output unit outputting an input character as a sound and the character input apparatus 1 of the present disclosure further includes an audio output unit 50 that outputs the input language character as a sound when the speaker key is pressed or touched. The storage unit 40 stores voice information regarding pronunciation and sound for each language and when the controller 30 recognizes the input of the speaker key 150, the control unit 30 may control the storage unit 40 and the audio output unit 50 so as to read the voice information stored in the storage unit 40 and output the read voice information to the audio output unit 50.

According to the present disclosure, as illustrated in FIGS. 9A to 9D, when "버스정류장이 어디입니까?" is input via the Korean input unit 13 and then, the translation key 140 is input, "Where is the bus stop?" is displayed in the character display unit and in this case, when the speaker key 150 is pressed or touched, the audio output unit 50 outputs the translated English characters as the sound.

As illustrated in FIG. 12A, when "버스정류장이 어디입니까?" is input via the Korean input unit and then, the translation key is input, "Where is the bus stop?" is displayed in the English display unit and in this case, when the speaker key 150 is pressed or touched, the audio output unit 50 outputs the translated English characters as the sound.

According to the present disclosure, as illustrated in FIGS. 9A to 9D, both the characters before translation and the characters after translation may be displayed on one character display unit 20 and the translated characters may be output as the sound through the translation key 140. Further, according to the present disclosure, as illustrated in FIG. 12A, the characters before translation and the characters after translation may be classified and displayed on two divided character display units 20 and each of the characters before or after translation may be output as the sound through the translation key 140.

According to the present disclosure, as illustrated in FIG. 12B, even in the collectively translated characters, the characters translated for each language may be output as the sound. When "버스정류장이 어디입니까?" is input via the Korean input unit and then, the translation key is input, the input contents are translated into English and displayed as "Where is the bus stop?" in the English display unit, translated into Russian and displayed as "Где автобусная остановка?" in the Russian display unit, and translated into Greek and displayed as "Που ειναι η σταση του λεωφορειου?" in the Greek display unit, and when each speaker key is pressed or touched in each character display unit, the sound of each corresponding language may be heard.

According to the present disclosure, the sound is provided along with the translation, so that foreign language conversation learning, translation, and interpretation may be efficiently performed, and contents to be said are input and translated and then, output as the sound at the time of communication with a foreigner, thereby enhancing efficiency of the communication with the foreigner. Further, the present disclosure may provide efficient communication among people with different nationalities even though the people do not know the languages of other parties.

The audio output unit 50 is configured in the same number as the number of speaker keys and is matched one to one with each speaker key. As illustrated in FIG. 13, there may be n (n is a natural number) language input units in the character input unit, and n character display units and n audio output units are present to interlock with each other. Here, the characters input by the n-th language input unit may be displayed on the n-th character display unit and may be heard through the n-th audio output unit.

The user may hear the sound of the characters input in the first language input unit 17a and displayed in the first character display unit 27a from the first audio output unit 57a separately and other language input units operate similarly. In this case, an earphone may be connected to each audio output unit or a Bluetooth earphone may be interlocked with each audio output unit to hear the sound of characters displayed on each character display unit.

The audio output unit 50 outputs the input Korean characters as the sound when the Korean characters are displayed in the Korean display unit 23 and the input of the speaker key 150 is received.

FIGS. 14A to 14C illustrate examples of a configuration in which a language input unit and a character display unit are arranged according to a fifth embodiment and the character display unit 20 is divided into one or more character display units with the same number as the number of language input units and each language input unit and the divided character display unit are matched one to one.

The language input unit and the character display unit, which are matched one-to-one, are arranged adjacent to each other to from in a pair of groups. Each group including the language input unit and the character display unit matched one-to-one is symmetrically arranged in a horizontal or a vertical direction with respect to the center of the character input apparatus to face each other.

FIGS. 14A and 14B illustrate examples in which a pair of the Korean input unit 13 and the Korean display unit 23 (hereinafter, referred to as a Korean input unit pair. The same is applied for other languages.) and a pair of the English input unit 14 and the English display unit 24 are arranged to face each other with respect to the center of the character input apparatus. In this manner, a plurality of users face each other to input Korean and English, input a translation key, display the translated contents on each character display unit, and make the sound of each language by pressing the speaker key, thereby enabling efficient communication.

According to the present disclosure, as illustrated in FIG. 14B, diversity of character input may be provided and the spatial utilization of the display may be increased by arranging miscellaneous input units based on numeric keys, symbol keys, and emoticon keys on the left and right of the language input unit.

According to the present disclosure, as illustrated in FIG. 14C, the Korean input unit pair and an English input unit pair are arranged side by side on one side of the character input apparatus, facing the center of the character input apparatus, and a Russian input unit pair and a Greek input unit pair are arranged side by side on the other side, facing the center of the character input apparatus in the same manner as above. In this manner, since the user may input his/her native language in a state where Korean, English, Russian, and Greek users are gathered, provide the translated characters using the translation key, and hear the sound of each language by inputting the speaker key, a plurality of people may easily conduct multi-party communication even though the people do not know a foreign language.

In addition, according to the present disclosure, when the earphone is connected to the audio output unit 50 or the Bluetooth earphone is used, a plurality of people may input their native languages, translate the languages of other parties by pressing the translation key, and immediately hear the translated languages through the earphone by pressing the speaker key, and as a result, the people may immediately hear the sound in their native languages. In this case, when one user inputs the native language and then, presses the translation key, the other persons may immediately hear the sound translated into the respective native languages with their earphones without pressing the speaker key.

FIG. 15 illustrates an example of a configuration in which a language input unit and a character display unit are arranged according to a sixth embodiment. In an embodiment of the present disclosure, a plurality of language input units may be provided and the character display unit may be divided by one-to-one matching with the language input unit. In this case, it may be set which language input unit the input characters interlock with. When the setting key 120 is input via the miscellaneous input unit, an interlocking key 122 for designating an arrangement location and an arrangement order of the language input unit is displayed in a set area and when at least one portions of the interlocking key 122 are selected, input interlocking is set so that the characters input via the miscellaneous input unit are displayed in the character display unit which is matched with the language input unit corresponding to the selected interlocking key 122 one to one when the characters are input via the miscellaneous input unit.

The interlocking key 122 may be displayed in the form of "1", "2", "3", and "4" and displayed in the form of "upper", "lower", "left", and "right" as illustrated in FIG. 6A. For example, when the user presses the setting key and presses the numeral and then, presses the interlocking key 122 of "left" in the miscellaneous list 121, the numeral input via the numeral input unit is displayed by interlocking with the character display unit matched to the left language input unit.

As illustrated in FIG. 15, the Korean input unit 13, the English input unit 14, and a first miscellaneous input unit 12h based on the numeral input unit 12a may be arranged on one side in a row and the Russian input unit 15, the Greek input unit 18, and a second miscellaneous input unit 12i based on the emoticon input unit 12d may be arranged on the other side in a row.

Here, the Korean input unit may be the first language input unit 17a and the Korean display unit 23 may be the first character display unit 27a, the English input unit 14 may be the second language input unit 17b and the English display unit 24 may be the second character display unit 27b, the Greek input unit 18 may be the third language input unit 17c and the Greek display unit 26 may be the third character display unit 27c, and the Russian input unit 15 may be the fourth language input unit 17d and the Russian display unit 25 may be the fourth character display unit 27d.

When the user presses the setting key 120 on the second miscellaneous input unit 12h and presses and selects the interlocking key 122 of "1", the user may simultaneously perform the character input of the Korean input unit 13 and the input of the first miscellaneous input unit 12h by interlocking the character input of the Korean input unit 13 and the input of the first miscellaneous input unit 12h with each other and the contents input in the first miscellaneous input unit 12h are displayed in the Korean display unit 23 which is the first character display unit.

When the user presses the setting key 120 on the first miscellaneous input unit 12i and presses and selects the interlocking key 122 of "3", the user may simultaneously perform the character input of the Greek input unit 18 and the input of the second miscellaneous input unit 12i by interlocking the character input of the Greek input unit 18 and the input of the second miscellaneous input unit 12i with each other and when the contents are input via the second miscellaneous input unit 12h, the contents are input in the Greek display unit 26 which is the third character display unit.

As described above, the present disclosure provides a character input apparatus that may efficiently and completely input the characters of the plurality of languages at the same time without language conversion without converting the character input unit by continuously expressing the characters of the plurality of languages on the character input unit at the time of simultaneously inputting the characters of the plurality of languages.

INDUSTRIAL APPLICABILITY

The present disclosure may be used as a character input apparatus that efficiently inputs e-mails or text messages at the time of simultaneously inputting two or more languages by continuously arranging two or more language input units and one or more miscellaneous input units.

What is claimed is:

1. A character input apparatus comprising:
a character input unit for inputting of a character; and
a character display unit for displaying the input character on a display,
wherein the character input unit is divided into a language input unit for inputting a language character and a miscellaneous input unit
wherein two or more language input units and one or more miscellaneous input units are arranged in the character input unit and characters of two or more languages are displayed in the character input unit to allow inputting the characters of two or more languages without an operation of language conversion,
wherein the character input unit displays a language list and a designation key if an input is applied to a language function key included in the character input unit,
wherein the language list is displayed in an area of the character input unit for allowing registration, change or deletion of a selected language from the language input unit, and
wherein the character input unit displays the designation key for designating an arrangement of the language input unit.

2. The character input apparatus of claim 1, wherein the character input unit is divided into a right character input unit, a left character input unit, an upper character input unit, a lower character input unit, and a central character input unit, and
if the language function key is input via the character input unit, the character input unit provides a layout key for designating an arrangement of the language input unit onto at least one of an upper side, a lower side, a left side, and a right side.

3. The character input apparatus of claim 1, wherein the miscellaneous input unit comprises at least one of a numeral input unit, a symbol input unit, a special character input unit, an emoticon input unit, an edition input unit, a function input unit, and a setting input unit.

4. The character input apparatus of claim 3, wherein if a setting key is input via the miscellaneous input unit, a miscellaneous list for one or more keys related to a miscellaneous input including at least one of a numeral, a symbol, a special character, an emoticon, an edition key, a function key, and a setting key is displayed in an area and selection of the miscellaneous input key is provided in the miscellaneous list for registering, changing, or deleting keys.

5. The character input apparatus of claim 3, wherein if a setting key is input via the miscellaneous input unit, an interlocking key for designating an arrangement location and an arrangement order of the language input unit is displayed in a set area and if at least one portion of the interlocking key is selected, input interlocking is set so that characters input via the miscellaneous input unit are displayed in the character display unit which is matched with the language input unit corresponding to the selected interlocking key if the characters are input via the miscellaneous input unit.

6. The character input apparatus of claim 1, wherein
the language input unit of the character input unit is changed to another language input unit or a miscellaneous input unit if a sliding input in a predetermined direction is detected with a predetermined point in an area of the language input unit being pressed down, a predetermined direction including up, down, left, or right, and
wherein the miscellaneous input unit of the character input unit is changed to another miscellaneous input unit or a language input unit if a sliding input in a predetermined direction is detected with a predetermined point in an area of the miscellaneous input unit being pressed down, the predetermined direction including up, down, left, or right.

7. The character input apparatus of claim 1, further comprising:
a controller, wherein the controller operates by:
controlling an operation of the character input unit so that each key of the character input unit is registered, changed, or deleted and
controlling an operation of the character input unit so that data produced or uploaded by a user is registered, changed, or deleted.

8. The character input apparatus of claim 1, wherein if a translation key is input via the character input unit in a state in which a character is input via one language input unit, the character input via one language input unit is translated into languages corresponding to other language input units.

9. The character input apparatus of claim 1, wherein the character display unit is divided into one or more character display units corresponding to the language input units.

10. The character input apparatus of claim 9, wherein if a translation key is input via the character input unit in a state in which a character is input as a language of one language input unit, a language character input as the language of one language input unit is collectively translated into language characters of the other language input units, and wherein the collectively translated language characters are classified by a language of each of the other language input units, and the divided character display units matched with each of the other language input units display the classified language characters.

11. The character input apparatus of claim 9, wherein the language input unit and the corresponding character display unit are arranged adjacent to each other to form a pair of groups, and
wherein each group including the language input unit and the corresponding character display unit is symmetrically arranged in a horizontal or vertical direction to face each other with respect to a center of the character input apparatus.

12. The character input apparatus of claim 1, further comprising a controller, wherein the character input unit includes n language input units, n being a natural number,
wherein the character display unit is divided into n character display units, so that a character input via an n-th language input unit is displayed in an n-th character display unit and
wherein the controller operates by: controlling a sound output of n audio output units,
so that a sound of the character displayed in the n-th character display unit is output through an n-th audio output unit.

13. The character input apparatus of claim 1, further comprising:
 a storage unit for storing at least one of input information including character information displayed on the character input unit, a program for executing the operation of the character input unit, and input information including data input via the character input unit.

\* \* \* \* \*